US008165076B2

(12) United States Patent
Wang et al.

(10) Patent No.: US 8,165,076 B2
(45) Date of Patent: Apr. 24, 2012

(54) RESOURCE ALLOCATION METHOD FOR MULTI-USERS MULTIPLE INPUT MULTIPLE OUTPUT ORTHOGONAL FREQUENCY DIVISION MULTIPLEXING SYSTEM AND APPARAUS THEREOF

(75) Inventors: Li-Chun Wang, Hsinchu (TW); Chu-Jung Yeh, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 844 days.

(21) Appl. No.: 12/208,319

(22) Filed: Sep. 10, 2008

(65) Prior Publication Data

US 2010/0061312 A1 Mar. 11, 2010

(51) Int. Cl.
*H04W 4/00* (2009.01)
(52) U.S. Cl. .................................................. 370/329
(58) Field of Classification Search .................. 370/329, 370/319, 341, 343, 344; 455/450–453, 464, 455/509
See application file for complete search history.

(56) References Cited

U.S. PATENT DOCUMENTS

| 7,020,110 | B2 | 3/2006 | Walton et al. | |
| 2003/0013451 | A1* | 1/2003 | Walton | 455/447 |
| 2003/0139196 | A1* | 7/2003 | Medvedev et al. | 455/522 |
| 2008/0137764 | A1* | 6/2008 | Kim et al. | 375/260 |
| 2010/0166097 | A1* | 7/2010 | Zhou et al. | 375/267 |

FOREIGN PATENT DOCUMENTS

CN 1812386 8/2006

OTHER PUBLICATIONS

"First Office Action of China Counterpart Application", issued on Feb. 24, 2011, p. 1-p. 4, in which the listed reference was cited.
Rhee et al., "Increase in Capacity of Multiuser OFDM System Using Dynamic Subchannel Allocation," in Proc. of IEEE Int. Vehicular Tech. Conf., May 2000, pp. 1085-1089.
Li et al., "On the Optimality of Downlink OFDMA MIMO Systems," Conference Record of the Thirty-Eighth Asilomar Conference on Signals, Systems and Computers, vol. 1, Nov. 2004, p. 324-328.
Senel et al., "Spatial Multiplexing with Opportunistic Scheduling for Multiuser MIMO-OFDM Systems," IEEE Global Telecommunications Conference, Nov. 2006, pp. 1-5.
Shen et al., "Adaptive Resource Allocation in Multiuser OFDM Systems With Proportional Rate Constraints," IEEE Transactions on Wireless Communications, vol. 4, No. 6, Nov. 2005, pp. 2726-2737.
Wong et al., "A Low Complexity Algorithm for Proportional Resource Allocation in OFDMA Systems," in IEEE international Signal Processing Systems Workshop, Oct. 2004, pp. 1-6.
Li et al., "Dynamic Resource Allocation with Finite Buffer Constraint in Broadband OFDMA Networks," Wireless Communications and Networking, 2003, WCNC, vol. 2, Mar. 2003, pp. 1037-1042.
"Search Report of German counterpart application", issued on May 27, 2009, p. 1-p. 8.

* cited by examiner

*Primary Examiner* — Derrick Ferris
*Assistant Examiner* — Mang Yeung
(74) *Attorney, Agent, or Firm* — Jianq Chyun IP Office

(57) ABSTRACT

The present invention is direct to the resource allocation method for MU-MIMO-OFDM system and the apparatus thereof. The MU-MIMO-OFDM system has a plurality of users and a plurality of sub-channels. The sub-channels are assigned to the users according to the capacity ratio constraints and a scheduling rule, and then the power of the user is determined according to the limit power of the MU-MIMO-OFDM system. Wherein the values of power of the sub-channels assigned to the user are the same, the scheduling rule may be Max-Min or Max Sum-Rate rule, and the allocation of the sub-channels may be user-oriented or sub-channel oriented.

27 Claims, 11 Drawing Sheets

RESOURCE ALLOCATION METHOD FOR MULTI-USERS MULTIPLE INPUT MULTIPLE OUTPUT ORTHOGONAL FREQUENCY DIVISION MULTIPLEXING SYSTEM AND APPARAUS THEREOF

BACKGROUND OF THE INVENTION

1. Field of Invention

The present invention generally relates to a resource allocation method and an apparatus thereof, and more particularly to a resource allocation for a multi-users multiple input multiple output orthogonal frequency division multiplexing (hereinafter, referred as MU-MIMO-OFDM) system, and an apparatus thereof.

2. Description of Prior Art

Although there were many researches of power and bandwidth allocation method in OFDM systems, these researches usually discussed how to assign power to each sub-channel on the constraint of fixed total power. Recently, the multiple input multiple output (hereinafter, referred as MIMO) system is a main technology researched widely. By using the MIMO system, the transmission rate thereof is enhanced. Because the MIMO system divides its power to each of its antennae, the covering range thereof is smaller that of the single input single output (hereinafter, referred as SISO) system.

In the environment of multi-users, a scheduling algorithm is applied to enhance the signal strength of the antenna which has smallest signal strength, so as to achieve soft coverage enhancement without adding any transmit power to the hardware thereof.

MIMO-OFDM system has become a mainstream technology which enhances the capacity of the wireless communication system, such as IEEE 802.16m WiMax, 3GPP LTE, and so on. Differing from the OFDM system, the sub-channel of the MIMO-OFDM system has a plurality of eigenmode links, and the smallest eigenmode link tends to be affected by the path loss and channel fading. Due to the path loss and channel fading, the signal to noise ratio (hereinafter, referred as SNR) or the capacity of the smallest eigenmode link may not meet the requirements, and therefore link outage may occur. Accordingly, the phenomenon makes each sub-channel of the MIMO system not achieve multiplexing.

In the practical use, because users pay different charges for the internet services provider and transmit different sizes of the transmission data, the communication system must provide a flexible transmission rate for each user. However, there are few researches of resource allocation method for the MU-MIMO-OFDM system when taking the coverage issue in consideration.

SUMMARY OF THE INVENTION

Accordingly, the present invention is direct to the resource allocation methods for MU-MIMO-OFDM system and the apparatuses thereof.

According to one of the exemplary examples, the present invention provides a resource allocation method for a MU-MIMO-OFDM system. The MU-MIMO-OFDM system has a plurality of users and sub-channels, and the method comprises the following steps: (a) a plurality of preset assigned sub-channel numbers are assigned to the users according a plurality of capacity ratio constraints; (b) each user sequentially selects one of the sub-channels according to a scheduling rule; (c) determining one of the users who has a right of selecting the non-assigned sub-channels according to a plurality of assigned capacities and the capacity ratio constraints of the users, and then the user who has the right of selecting the non-assigned sub-channels selects one of the non-assigned sub-channels according to the scheduling rule, and if the number of the sub-channels assigned to the user is equal to the preset assigned sub-channel number thereof, the user exits the competition of determining the right of selecting the non-assigned sub-channels in the step; (d) determining if the number of the sub-channels assigned to all of the users is equal to the summation of the preset assigned sub-channel numbers of all of the users; (e) determining one of the users who has the right of selecting the non-assigned sub-channels according to the assigned capacities and capacity ratio constraints of the users, and then the user who has the right of selecting the non-assigned sub-channels selects one of the non-assigned sub-channels according to the scheduling rule, the step is repeated until all of the sub-channels are assigned to the users.

According to one of the exemplary examples, the present invention provides a resource allocation apparatus for a MU-MIMO-OFDM system. The MU-MIMO-OFDM system has a plurality of users and sub-channels, and the resource allocation apparatus comprises a sub-channel resource allocation apparatus. Wherein the sub-channel resource allocation apparatus first assigns a plurality of preset assigned sub-channel numbers to the users according a plurality of capacity ratio constraints. Next, the sub-channel resource allocation apparatus assigns one of the sub-channels to each user sequentially according to a scheduling rule. Next, the sub-channel resource allocation apparatus assigns the non-assigned sub-channels to one of the users who has a right of selecting the non-assigned sub-channels according to the scheduling rule until the number of the sub-channels assigned to all of the users meets the summation of the preset assigned sub-channel numbers of all of the users. Next, the sub-channel resource allocation apparatus assigns each the non-assigned sub-channels to one of the users who has a right of selecting the non-assigned sub-channels according to the scheduling rule until all non-assigned sub-channels assigned.

According to one of the exemplary examples, the present invention provides a resource allocation method for a MU-MIMO-OFDM system. The MU-MIMO-OFDM system has a plurality of users and sub-channels, and the method comprises the following steps: (a) a plurality of preset assigned sub-channel numbers are assigned to the users according a plurality of capacity ratio constraints; (b) each of the first through x-th sub-channels sequentially selects one of the users according to a scheduling rule, if the number of the sub-channels assigned to the user is equal to the preset assigned sub-channel number thereof, the user exits the competition to be assigned one of the sub-channels in the step, wherein x is the summation of the preset assigned sub-channel numbers; (c) each of the non-assigned sub-channels sequentially selects one of the users according to a scheduling rule, wherein the user is assigned at most one of the non-assigned sub-channels in the step.

According to one of the exemplary examples, the present invention provides a resource allocation apparatus for a MU-MIMO-OFDM system. The MU-MIMO-OFDM system has a plurality of users and sub-channels, and the resource allocation apparatus comprises a sub-channel resource allocation apparatus. Wherein the sub-channel resource allocation apparatus first assigns a plurality of preset assigned sub-channel numbers to the users according a plurality of capacity ratio constraints. Next, the sub-channel resource allocation apparatus sequentially assigns each of the first through x-th sub-channels to one of the users according to a scheduling rule, wherein x is the summation of the preset assigned sub-channel numbers. Next, the sub-channel resource allocation apparatus sequentially assigns each of the non-assigned sub-channels to one of the users according to a scheduling rule, wherein the user is assigned at most one of the non-assigned sub-channels.

According to one of the exemplary examples, the present invention provides a resource allocation method for a MU-MIMO-OFDM system. The MU-MIMO-OFDM system has a plurality of users and sub-channels, and the method comprises the following steps: (a) each of the sub-channels sequentially selects one of the users according to a scheduling rule.

According to one of the exemplary examples, the present invention provides a resource allocation apparatus for a MU-MIMO-OFDM system. The MU-MIMO-OFDM system has a plurality of users and sub-channels, and the resource allocation apparatus comprises a sub-channel resource allocation apparatus. The sub-channel resource allocation apparatus is adapted for sequentially assigning each of the sub-channels to one of the users according to a scheduling rule.

Accordingly, compared to the conventional resource allocation methods and apparatuses, the resource allocation methods and apparatuses provided by the exemplary examples have the lower complexity. Further, the resource allocation methods and apparatuses provided by the exemplary examples can be applied to the MU-MIMO-OFDM system, which the sizes of data transmissions of different users may be different. When the method adapts the Max-Min scheduling rule, the coverage ranges of the MU-MIMO-OFDM system are enhanced. When the method adapts the Max Sum-Rate scheduling rule, the capacities of the MU-MIMO-OFDM system are enhanced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
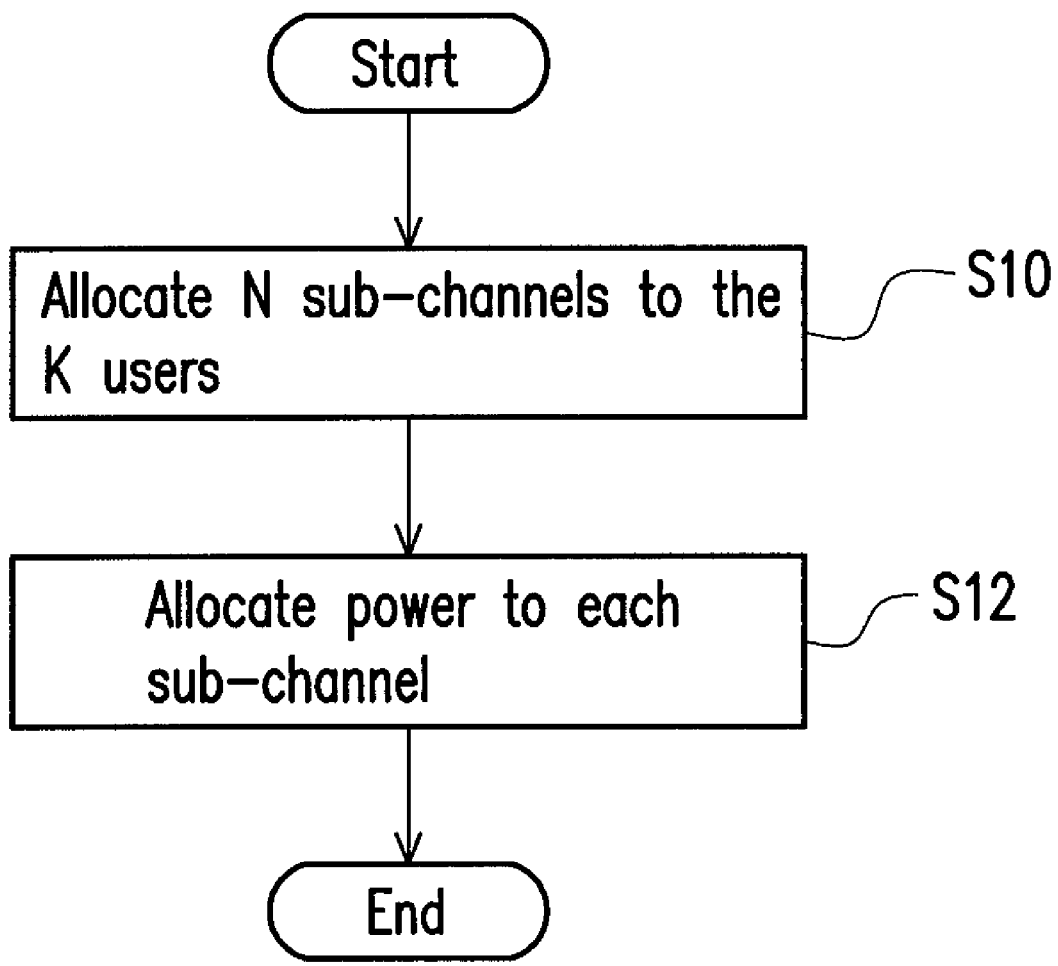
FIG. 1 is the flow chart of the resource allocation method for the MU-MIMO-OFDM system according to one exemplary example of the present invention.

Reference will now be made in detail to the present preferred embodiment of the invention, examples of which are illustrated in the accompanying drawings. Wherever possible, the same reference numbers are used in the drawings and the description to refer to the same or like parts.

Each of the following exemplary examples is direct to the resource allocation method and apparatus for the MU-MIMO-OFDM system. The resource allocation method and apparatus assign the sub-channels to each of the users according to a capacity ratio constraint. Further the resource allocation method and apparatus considers the coverage issue while assigning the sub-channels to each of the users according to the capacity ratio constraint. In other word, the exemplary example designs a scheduling algorithm of sub-channels allocation while considering power allocation. Therefore, link quality of each sub-channel assigned to the user is maximized, and the ratio of the transmission data sizes of all users is met.

For the constraint of fixed power, the problem to maximize the system capacity is modeled as the following equations:

$$\max_{P_{k,n}, I_{k,n}} \frac{1}{N} \sum_{k=1}^{K} \sum_{n=1}^{N} I_{k,n} \sum_{i=1}^{M_t} \log\left(1 + \frac{g_k P_{k,n} \lambda_{k,n,i}}{M_t \sigma^2}\right)$$

subject to $$C1: \sum_{k=1}^{K} \sum_{n=1}^{N} P_{k,n} \leq P_{max}$$

$C2: P_{k,n} \geq 0 \quad \text{for all } k, n$ $C3: I_{k,n} = \{0, 1\} \quad \text{for all } k, n$ $$C4: \sum_{k=1}^{K} I_{k,n} = 1 \quad \text{for all } n$$

$C5: C_1 : C_2 : \ldots : C_K = \eta_1 : \eta_2 : \ldots : \eta_K,$ wherein the number of the sub-channels is N, the number of the antennae is $M_t$, the number of the users is K, $P_{k,n}$ is the power of the n-th sub-channel of the k-th user, $I_{k,n}$ is the indicator represented if the n-th sub-channel is occupied by the k-th user, $g_k$ is the channel fading factor (i.e. large-scale slowly-varying behavior of the local average channel gain) of the k-th user, $\lambda_{k,n,i}$ is i-th eigenmode of the n-th sub-channel assigned to the k-th user, and the noise power is $\sigma^2$. Where k is an integer from 1 to K, n is an integer from 1 to N, and i is an integer from 1 to $M_t$.

The constraint C1 means the total power is less than or equal to the fixed power $P_{max}$. The constraint C2 means the power of n-th sub-channel of the k-th user is positive. The constraint C3 defines the value of the indicator $I_{k,n}$, in which 1 means the n-th sub-channel is occupied by the k-th user, and 0 means the n-th sub-channel is not occupied by the k-th user. The constraint C4 means the n-th channel is only assigned to one of the K users, that is, the n-th channel is not occupied by more than one user. The constraint C5 is the capacity ratio constraint, in which the capacity of the k-th user is $C_k$ represented as $$C_k = \sum_{n=1}^{N} I_{k,n} \sum_{i=1}^{M_t} \log\left(1 + \frac{g_k P_{k,n} \lambda_{k,n,i}}{M_t \sigma^2}\right).$$

As stated above, the n-th sub-channel of the k-th user has many eigenmode. It is noted that the weakest eigenmode link of the MIMO channel represents as $\lambda_{k,n,1}$. The weakest eigenmode link $\lambda_{k,n,1}$ determines the covering range of the n-th sub-channel of the k-th user of the MIMO system. In other word, the channel gain of the eigenmode link $\lambda_{k,n,1}$ is weakest, and therefore an error is easily occurred, and further an outage is occurred due to the low SNR. The more power is assigned to the stronger eigenmode link, and the smaller covering range is covered (i.e. which easily causes outage in the weakest eigenmode link). Hence, the power assigned to the MIMO eigenmodes of each sub-channel of the k-th user is determined according to the power $P_{k,n}$.

Referring to FIG. 1, FIG. 1 is the flow chart of the resource allocation method for the MU-MIMO-OFDM system according to one exemplary example of the present invention. In the step S10, the N sub-channels are allocated to the K users. Wherein, each of the sub-channels is only assigned to one of the K users. Then, in step S12, the power of each sub-channel is allocated. The power $P_{k,n}$ of the n-th sub-channel of the k-th user is the total assigned power of the k-th user divided by the number of the assigned sub-channel of the k-th user. In the exemplary example, the sub-channel allocation is first executed, and then the power allocation is executed, so as to reduce the complexity of the method.

Figure 2A:
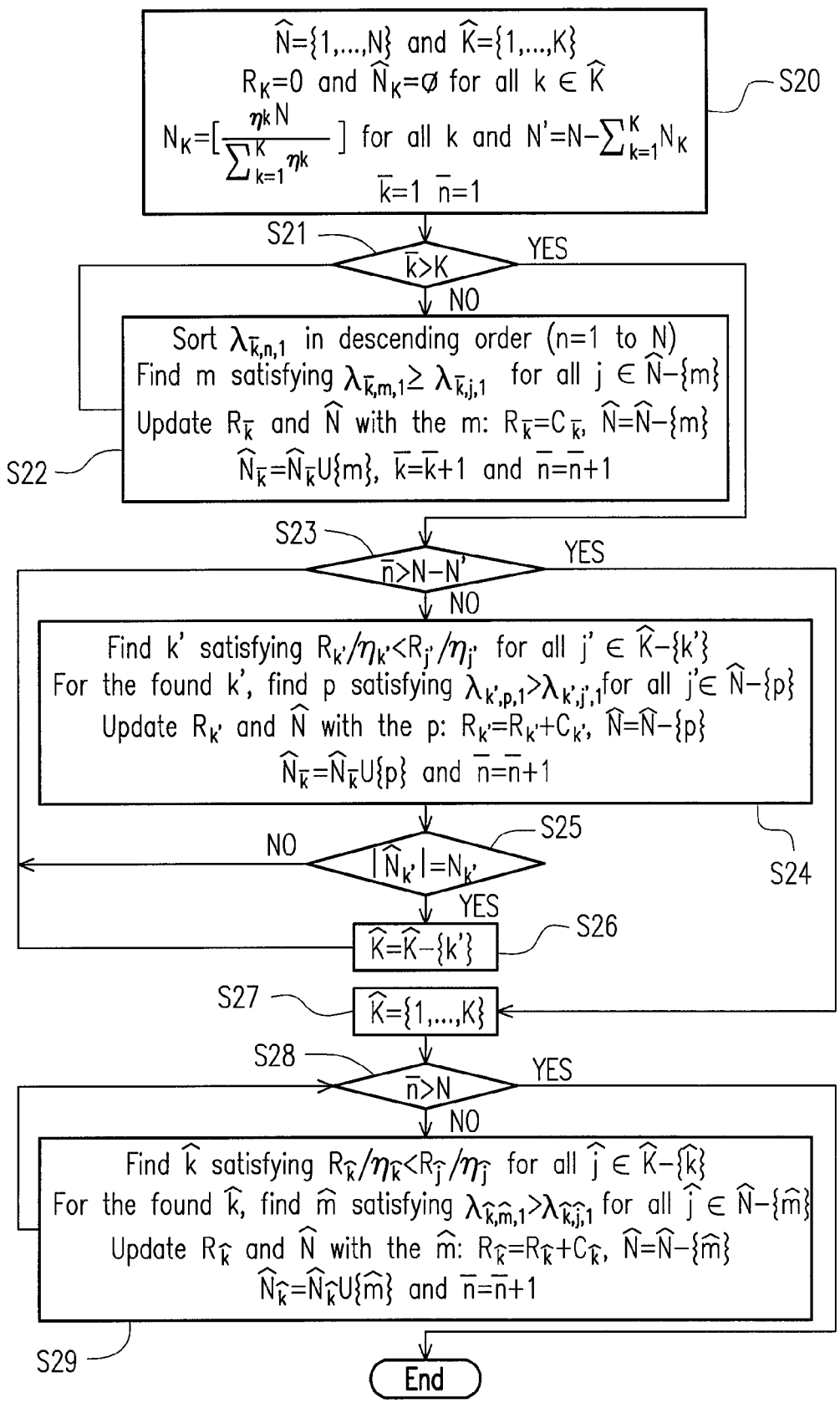
FIG. 2A is the flow chart of step S10 according to one exemplary example of the present invention.

Referring to FIG. 2A, FIG. 2A is the flow chart of step S10 according to one exemplary example of the present invention. In this exemplary example, the step S10 is implemented by the point of the user oriented sub-channel allocation algorithm with Max-Min scheduling rule. However the exemplary example provided by FIG. 2A is not used to limit the scope of the invention.

In step S20, a preset assigned sub-channel number $N_k$ is assigned to the k-th user according the capacity ratio constraint, wherein the preset assigned sub-channel number $N_k$ represents the number of the sub-channels to be assigned to the k-th user. It is noted that $N_k$ may be determined by equation (1) but not used to limit the scope of the present invention. The equation (1) is defined as $$N_k = \left\lfloor \frac{\eta_k N}{\sum_{k=1}^{K} \eta_k} \right\rfloor. \quad (1)$$

Where $\lfloor x \rfloor$ represents the maximum integer less or equal to x. In step S20, the set, $\hat{N}=\{1, 2, \ldots, N\}$, represents the set of the members of the sub-channels, and the set, $\hat{K}=\{1, 2, \ldots, K\}$ represents the set of the members of the users. At the beginning, the capacity of k-th user $R_k$ is initially set to be 0 (i.e. $R_k=0$), and the set of the members of the sub-channels assigned to the k-th user $\hat{N}_k$ is initially set to be null (i.e. $\hat{N}_k=\phi$). After all of the preset assigned sub-channel numbers $N_k$ are assigned to the users, a preset residual sub-channel number N' is calculated by equation (2) but not used to limit the scope of the present invention, and then the counter numbers $\bar{k}$ and $\bar{n}$ are initially set to be 1. The equation (2) is expressed as $$N'=N-\Sigma_{k=1}^{K} N_k \quad (2).$$

Next, in step S21, judge if the count number $\bar{k}$ is larger than the number of the total users K. If the count number $\bar{k}$ is larger than the number of the total users K, step S23 will be executed. Otherwise, step S22 will be executed.

In steps S21 and S22, each user sequentially selects one of the sub-channels having the maximal weakest eigenmode of the MIMO system, and then the capacity of $\bar{k}$-th user $R_{\bar{k}}$, the sets $\hat{N}$ and $\hat{N}_{\bar{k}}$ are updated.

In step S22, all of the weakest eigenmode links of the $\bar{k}$-th user $\lambda_{\bar{k},n,1}$ (n=1 to N) are sorted in descending order, and then find a number m satisfying $\lambda_{\bar{k},m,1} \geq \lambda_{\bar{k},j,1}$ for all j, in which j belongs to the set $\hat{N}$ removing the number m (i.e. $j \in \hat{N}-\{m\}$). The capacity of $\bar{k}$-th user $R_{\bar{k}}$ and the sets $\hat{N}$ and $\hat{N}_{\bar{k}}$ are updated with the number m. The m-th sub-channel having the maximal weakest eigenmode of the MIMO system is assigned to the $\bar{k}$-th user. Thus the capacity of $\bar{k}$-th user $R_{\bar{k}}$ is equal to $C_{\bar{k}}$ (i.e. $R_{\bar{k}}=C_{\bar{k}}$), the number m is added in the set of the members of the sub-channels assigned to the k-th user $\hat{N}_k$ (i.e. $\hat{N}_k=\hat{N}_k \cup \{m\}$), and the number m is removed from the set of the members of the sub-channels $\hat{N}$ (i.e. $\hat{N}-\{m\}$). Wherein the capacity assigned to the $\bar{k}$-th user is expressed as $$C_{\bar{k}} = \sum_{i=1}^{M_t} \log\left(1 + \frac{g_{\bar{k}} P_{\bar{k},m} \lambda_{\bar{k},m,i}}{M_t \sigma^2}\right).$$

In step S22, finally the counter numbers $\bar{k}$ and $\bar{n}$ are increased by 1 (i.e. $\bar{k}=\bar{k}+1$ and $\bar{n}=\bar{n}+1$). After step S22 is executed, the resource allocation method provided by this exemplary example goes back to execute step S21. Thus each user sequentially selects one of the sub-channels having the maximal weakest eigenmode of the MIMO system.

It is noted that, the best sub-channel of the $\bar{k}$-th user may be chose by the previous user, and thus the $\bar{k}$-th user may not select the best sub-channel. However in the general case, the total number of the sub-channels N is extremely higher than the total number of the users K, and thus the above condition occurs with a very low probability.

Further, the sequence of the K users may be determined according to the priorities, and the priorities may be different and determined according to the costs which the users pay. In addition, the priorities may be determined according to the types of data transmission of the users, and the types of data transmission of the users may include real-time video data transmission, real-time audio data transmission, general file data transmission, and so on. Therefore, the user with the highest priority may first have the right to select the sub-channel.

As stated above, in step S22, all of the weakest eigenmode links of the $\bar{k}$-th user $\lambda_{\bar{k},n,1}$ (n=1 to N) are sorted in descending order first. This sub-step may reduce the computation complexity. Without sorting all of the weakest eigenmode links of the $\bar{k}$-th user $\lambda_{\bar{k},n,1}$ (n=1 to N), the method may compare all of the weakest eigenmode links of the $\bar{k}$-th user $\lambda_{\bar{k},n,1}$ (n=1 to N) while assigning the $\bar{k}$-th user one sub-channel.

In steps S23 through S26, determine the right of selecting the non-assigned sub-channels to the one of the users according to each of the assigned capacities and capacity ratio constraints of the users, and then assign one of the non-assigned sub-channels having the maximal weakest eigenmode of the MIMO system to the user having the right of selecting the non-assigned sub-channels. Supposing the user having the right of selecting the non-assigned sub-channels is k'-th user, after assigning one of the non-assigned sub-channels to the k'-th user, the capacity of k'-th user $R_{k'}$, the sets $\hat{N}$ and $\hat{N}_{k'}$ are updated. If the number of the sub-channels assigned to the k'-th user is equal to preset assigned sub-channel number $N_{k'}$, the k'-th user exits the competition of determining the right of selecting the non-assigned sub-channels to the one of the users.

In step S23, compare the counter number $\bar{n}$ and the summation of the preset assigned sub-channel numbers (i.e. $N-N'=\Sigma_{k=1}^{K} N_k$). If the counter number $\bar{n}$ is larger than the summation of the preset assigned sub-channel numbers (i.e. $\bar{n} > N-N'$), step S27 is executed. If the counter number $\bar{n}$ is less than or equal to the summation of the preset assigned sub-channel numbers (i.e. $\bar{n} \leq N-N'$), step S24 is executed.

In step S24, first find a number k' satisfying the condition that the capacity of k'-th user over the capacity ratio constraint of k'-th user is smaller than those of the other users (i.e. $R_k/\eta_k \leq R_j/\eta_j$, for all $j \in \hat{K}-\{k'\}$). Therefore, the user having the right of selecting the non-assigned sub-channels to the one of the users is determined to be k'-th user. Next, the k'-th user selects one of the non-assigned sub-channels having the maximal weakest eigenmode of the MIMO system. That is finding a number p satisfying $\lambda_{k',p,1} \geq \lambda_{k',j',1}$ for all j', in which j' belongs to the set $\hat{N}$ removing the number p (i.e. $j' \in \hat{N}-\{p\}$). The p-th sub-channel having the maximal weakest eigenmode of the MIMO system is assigned to the k'-th user. Thus the capacity of k'-th user $R_{k'}$ is equal to the previous $R_{k'}$ plus $C_{k'}$ (i.e. $R_{k'}=R_{k'}+C_{k'}$), the number p is added in the set of the members of the sub-channels assigned to the k'-th user $\hat{N}_{k'}$ (i.e. $\hat{N}_{k'}=\hat{N}_{k'} \cup \{p\}$), and the number p is removed from the set of the members of the sub-channels $\hat{N}$ (i.e. $\hat{N}-\{p\}$). In step S24, finally the counter number $\bar{n}$ is increased by 1 (i.e. $\bar{n}=\bar{n}+1$). After step S24 is executed, the resource allocation method provided by this exemplary example goes to execute steps S25 and S26.

In step S25, determine whether the number of the sub-channels assigned to the k'-th user is equal to preset assigned sub-channel number $N_{k'}$. If the number of the sub-channels assigned to the k'-th user is equal to preset assigned sub-channel number $N_{k'}$ (i.e. $|\hat{N}_{k'}|=N_{k'}$), step S26 will be executed; otherwise the method provided in the exemplary example will go back to step S23.

In step S26, remove the number k' from the set $\hat{K}$ (i.e. $\hat{K}-\{k'\}$), and thus the k'-th user exits the competition of determining the right of selecting the non-assigned sub-channels to the one of the users.

It is noted that determining the right of selecting the non-assigned sub-channels to the one of the users is user oriented. That is adjusting the capacity ratio in the point of the user, and then the user having the right selects one of the non-assigned sub-channels.

After each of the numbers of the sub-channels assigned to the each of the users is equal to the preset assigned sub-channel number, step S27 is executed. In steps S27 through S29, assign the residual sub-channels to the K users. In step S27 initialize the set of the members of the users $\hat{K}$, in which $\hat{K}=\{1, \ldots, K\}$. Then in step S28, determine whether the counter number $\bar{n}$ is larger than N. If the counter number $\bar{n}$ is larger than N, the sub-channel allocation will be completed. Otherwise, step S29 will be executed.

In step S29, first find a number $\hat{k}$ satisfying the condition that the capacity of $\hat{k}$-th user over the capacity ratio constraint of $\hat{k}$-th user is smaller than those of the other users (i.e. $R_{\hat{k}}/\eta_{\hat{k}} \leq R_{\hat{j}}/\eta_{\hat{j}}$ for all $\hat{j} \in \hat{K}-\{\hat{k}\}$). Therefore, the user having the right of selecting the non-assigned sub-channels to the one of the users is determined to be $\hat{k}$-th user. Next, the $\hat{k}$-th user selects one of the non-assigned sub-channels having the maximal weakest eigenmode of the MIMO system. That is finding a number $\hat{m}$ satisfying $\lambda_{\hat{k},\hat{m},1} \geq \lambda_{\hat{k},\hat{j},1}$ for all $\hat{j}$, in which $\hat{j}$ belongs to the set $\hat{N}$ removing the number $\hat{m}$ (i.e. $\hat{j} \in \hat{N}-\{\hat{m}\}$). The $\hat{m}$-th sub-channel having the maximal weakest eigenmode of the MIMO system is assigned to the $\hat{k}$-th user. Thus the capacity of $\hat{k}$-th user $R_{\hat{k}}$ is equal to the previous $R_{\hat{k}}$ plus $C_{\hat{k}}$ (i.e. $R_{\hat{k}}=R_{\hat{k}}+C_{\hat{k}}$), the number $\hat{m}$ is added in the set of the members of the sub-channels assigned to the $\hat{k}$-th user $\hat{N}_{\hat{k}}$ (i.e. $\hat{N}_{\hat{k}}=\hat{N}_{\hat{k}} \cup \{\hat{m}\}$), and the number $\hat{m}$ is removed from the set of the members of the sub-channels $\hat{N}$ (i.e. $\hat{N}-\{\hat{m}\}$). In step S29, finally the counter number $\bar{n}$ is increased by 1 (i.e. $\bar{n}=\bar{n}+1$).

After step S29 is executed, the method provided by this exemplary example goes back to step S28. After all of the residual sub-channels are assigned to the K users, the sub-channel allocation of the method provided by this exemplary example ends. It is noted that in the allocation process of FIG. 2A, the method determining the right of selecting one of the sub-channels to the user, and only the user having the right can select one of the sub-channels.

Figure 2B:
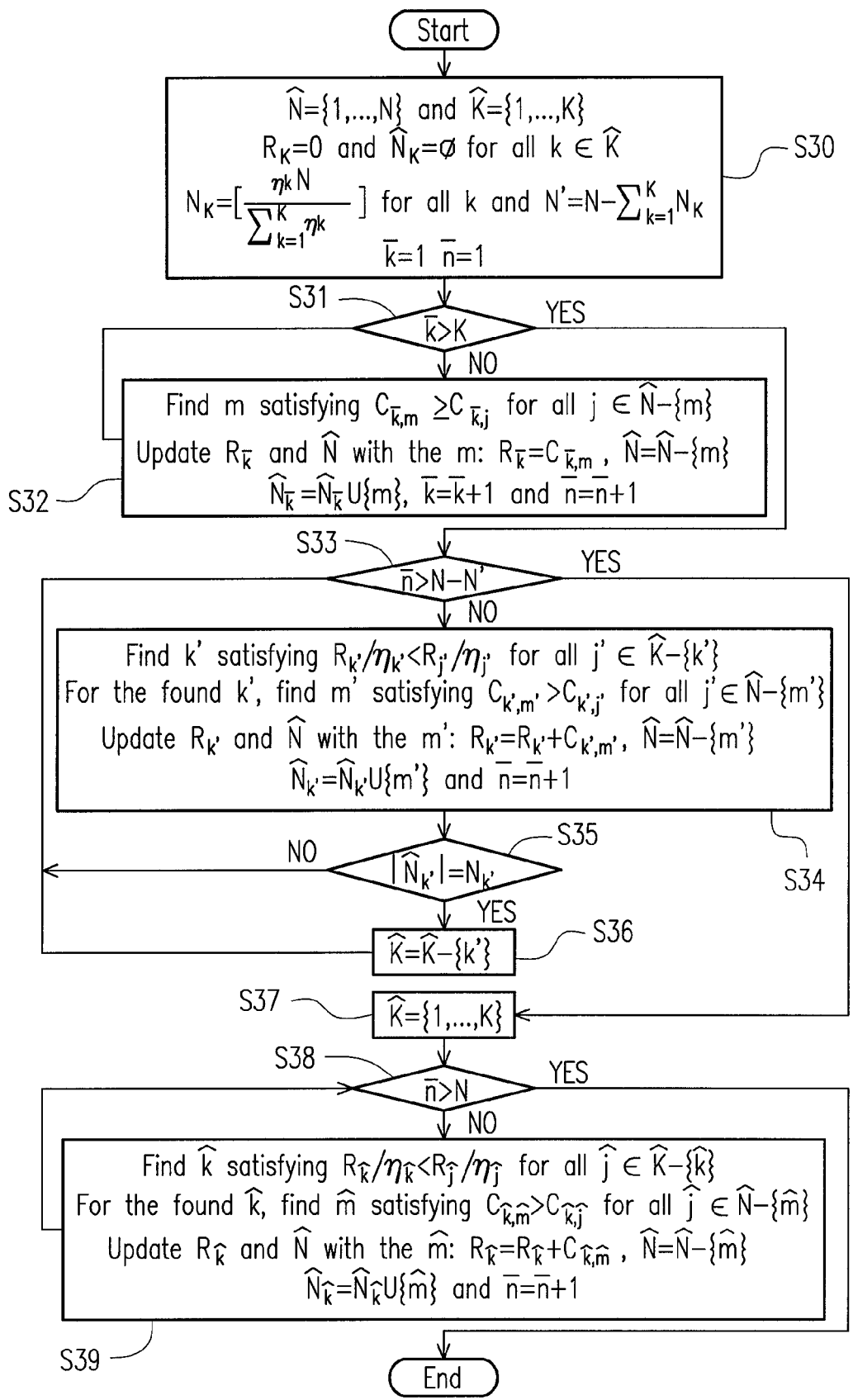
FIG. 2B is the flow chart of step S10 according to another one exemplary example of the present invention.

Referring to FIG. 2B, FIG. 2B is the flow chart of step S10 according to another one exemplary example of the present invention. Differing from FIG. 2A, the step S10 is implemented by the point of the user oriented sub-channel allocation algorithm with Max Sum-Rate scheduling rule. However the exemplary example provided by FIG. 2B is not used to limit the scope of the invention. Steps S30, S31, S33, and S36 through S38 are same as steps S20, S21, S23, and S26 through S28 respectively, and the details thereof are not described again herein. As stated above the differences between FIGS. 2A and 2B are scheduling rules. FIG. 2A adapts Max-Min scheduling rule, but FIG. 2B adapts Max Sum-Rate scheduling rule.

In steps S31 and S32, each user sequentially selects one of the sub-channels having the maximal capacity of the MIMO system, and then the capacity of $\bar{k}$-th user $R_{\bar{k}}$, the sets $\hat{N}$ and $\hat{N}_{\bar{k}}$ are updated.

In step S32, find a number m satisfying $C_{\bar{k},m} \geq C_{\bar{k},j}$ for all j, in which j belongs to the set $\hat{N}$ removing the number m (i.e. $j \in \hat{N}-\{m\}$). Wherein the capacity of the m-th sub-channel assigned to the $\bar{k}$-th user $C_{\bar{k},m}$ is expressed as $$C_{\bar{k},m} = \sum_{i=1}^{M_t} \log\left(1 + \frac{g_{\bar{k}} P_{\bar{k},m} \lambda_{\bar{k},m,i}}{M_t \sigma^2}\right).$$

The capacity of $\bar{k}k$-th user $R_{\bar{k}}$ and the sets $\hat{N}$ and $\hat{N}_{\bar{k}}$ are updated with the number m. The m-th sub-channel having the capacity of the MIMO system is assigned to the $\bar{k}$-th user. Thus the capacity of $\bar{k}k$-th user $R_{\bar{k}}$ is equal to $C_{\bar{k},m}$ (i.e. $R_{\bar{k}}=C_{\bar{k},m}$) the number m is added in the set of the members of the sub-channels assigned to the $\bar{k}$-th user $\hat{N}_{\bar{k}}$ (i.e. $\hat{N}_{\bar{k}}=\hat{N}_{\bar{k}} \cup \{m\}$), and the number m is removed from the set of the members of the sub-channels $\hat{N}$ (i.e. $\hat{N}-\{m\}$). In step S32, finally the counter numbers $\bar{k}$ and $\bar{n}$ are increased by 1 (i.e. $\bar{k}=\bar{k}+1$ and $\bar{n}=\bar{n}+1$). After step S32 is executed, the resource allocation method provided by this exemplary example goes back to execute step S31. Thus each user sequentially selects one of the sub-channels having the maximal capacity of the MIMO system.

It is noted that, the sub-channel having the maximal capacity of the $\bar{k}$-th user may be chose by the previous user, and thus the $\bar{k}$-th user may not select the sub-channel having the maximal capacity. However in the general case, the total number of the sub-channels N is extremely higher than the total number of the users K, and thus the above condition occurs with a very low probability.

Further, the sequence of the K users may be determined according to the priorities, and the priorities may be different and determined according to the costs which the users pay. In addition, the priorities may be determined according to the types of data transmission of the users, and the types of data transmission of the users may include real-time video data transmission, real-time audio data transmission, general file data transmission, and so on. Therefore, the user with the highest priority may first have the right to select the sub-channel.

In steps S33 through S36, determine the right of selecting the non-assigned sub-channels to the one of the users according to the assigned capacities and the capacity ratio constraints of the users, and then assign one of the non-assigned sub-channels having the maximal capacity of the MIMO system to the user having the right of selecting the non-assigned sub-channels. Supposing the user having the right of selecting the non-assigned sub-channels is k'-th user, after assigning one of the non-assigned sub-channels to the k'-th user, the capacity of k'-th user $R_{k'}$, the sets $\hat{N}$ and $\hat{N}_{k'}$ are updated. If the number of the sub-channels assigned to the k'-th user is equal to preset assigned sub-channel number $N_{k'}$, the k'-th user exits the competition of determining the right of selecting the non-assigned sub-channels to the one of the users.

In step S34, first find a number k' satisfying the condition that the capacity of k'-th user over the capacity ratio constraint ratio of k'-th user is smaller than those of the other users (i.e. $R_{k'}/\eta_{k'} \leq R_j/\eta_j$, for all $j \in \hat{K}-\{k'\}$). Therefore, the user having the right of selecting the non-assigned sub-channels to the one of the users is determined to be k'-th user. Next, the k'-th user selects one of the non-assigned sub-channels having the maximal capacity of the MIMO system. That is finding a number m' satisfying $C_{k',m'} > C_{k',j'}$ for all j', in which j' belongs to the set $\hat{N}$ removing the number m' (i.e. $j' \in \hat{N}-\{m'\}$). The m'-th sub-channel having the maximal capacity of the MIMO system is assigned to the k'-th user. Thus the capacity of k'-th user $R_{k'}$ is equal to the previous $R_{k'}$ plus $C_{k',m'}$ (i.e. $R_{k'}=R_{k'}+C_{k',m'}$), the number m' is added in the set of the members of the sub-channels assigned to the k-th user $\hat{N}_{k'}$ (i.e. $\hat{N}_{k'}=\hat{N}_{k'} \cup \{m'\}$), and the number m' is removed from the set of the members of the sub-channels $\hat{N}$ (i.e. $\hat{N}-\{m'\}$). In step S34, finally the counter number $\bar{n}$ is increased by 1 (i.e. $\bar{n}=\bar{n}+1$).

In step S39, first find a number $\hat{k}$ satisfying the condition that the capacity of $\hat{k}$-th user over the capacity ratio constraint of $\hat{k}$-th user is smaller than those of the other users (i.e. $R_{\hat{k}}/\eta_{\hat{k}} \leq R_{\hat{j}}/\eta_{\hat{j}}$ for all $\hat{j} \in \hat{K}-\{\hat{k}\}$). Therefore, the user having the right of selecting the non-assigned sub-channels to the one of the users is determined to be $\hat{k}$-th user. Next, the $\hat{k}$-th user selects one of the non-assigned sub-channels having the maximal capacity of the MIMO system. That is finding a number $\hat{m}$ satisfying $C_{\hat{k},\hat{m}} \geq C_{\hat{k},\hat{j}}$ for all $\hat{j}$, in which $\hat{j}$ belongs to the set $\hat{N}$ removing the number $\hat{m}$ (i.e. $\hat{j} \in \hat{N}-\{\hat{m}\}$). The $\hat{m}$-th sub-channel having the maximal capacity of the MIMO system is assigned to the $\hat{k}$-th user. Thus the capacity of $\hat{k}$-th user $R_{\hat{k}}$ is equal to the previous $R_{\hat{k}}$ plus $C_{\hat{k},\hat{m}}$ (i.e. $R_{\hat{k}}=R_{\hat{k}}+C_{\hat{k},\hat{m}}$), the number $\hat{m}$ is added in the set of the members of the sub-channels assigned to the $\hat{k}$-th user $\hat{N}_{\hat{k}}$ (i.e. $\hat{N}_{\hat{k}}=\hat{N}_{\hat{k}} \cup \{\hat{m}\}$), and the number $\hat{m}$ is removed from the set of the members of the sub-channels $\hat{N}$ (i.e. $\hat{N}-\{\hat{m}\}$). In step S39, finally the counter number $\bar{n}$ is increased by 1 (i.e. $\bar{n}=\bar{n}+1$).

Figure 2C:
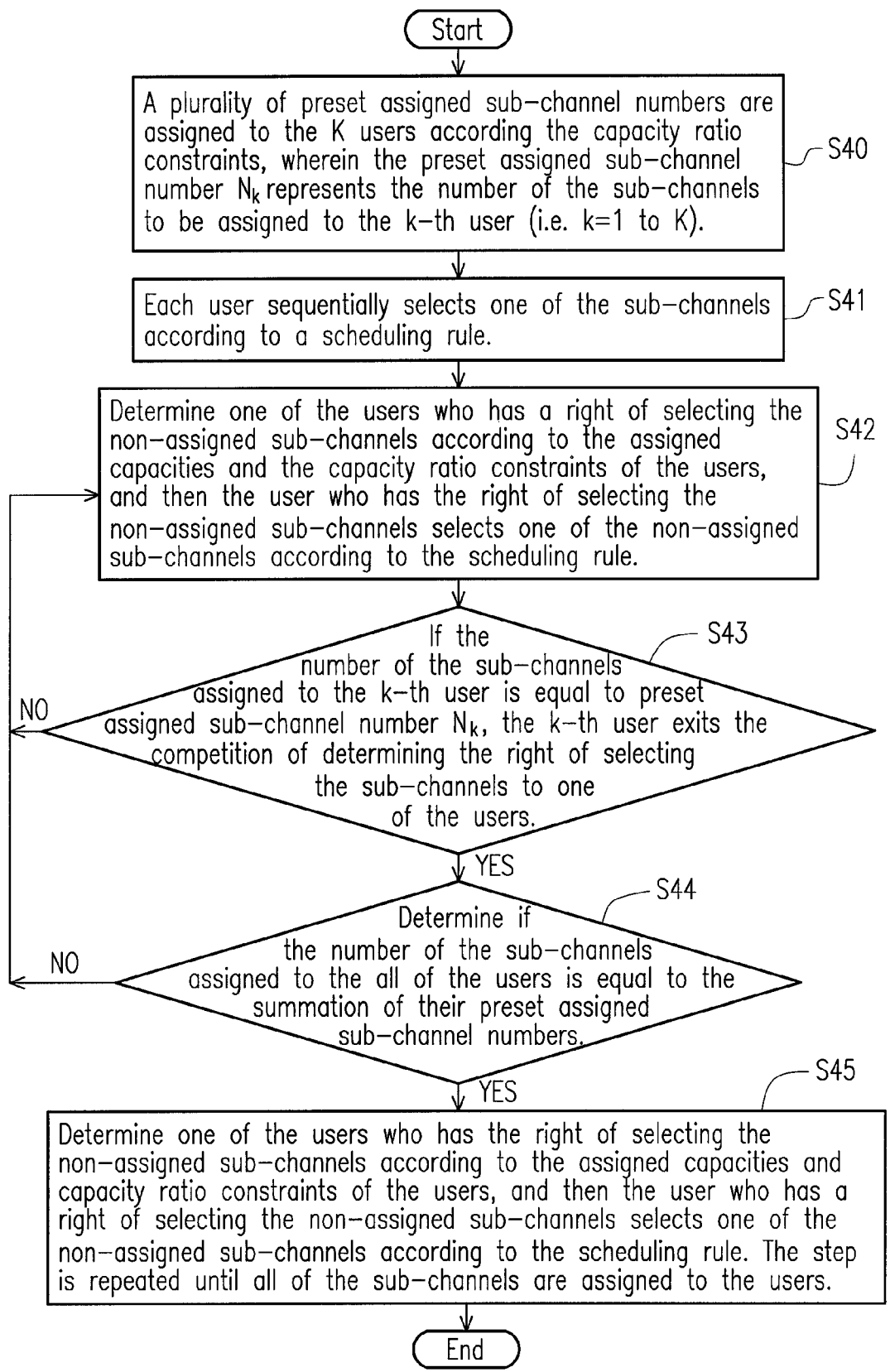
FIG. 2C is the flow chart of step S10 according to another one exemplary example of the present invention.

According to the above two exemplary examples, the sub-channels are assigned in the point of user-orientation. Referring to FIG. 2C, FIG. 2C is the flow chart of step S10 according to another one exemplary example of the present invention. It is noted that the scheduling rules are not limited in the FIGS. 2A and 2B, and FIG. 2C is a general flow chart of step S10 summarized by FIGS. 2A and 2B.

In step S40, a plurality of preset assigned sub-channel numbers are assigned to the K users according the capacity ratio constraint, wherein the preset assigned sub-channel number $N_k$ represents the number of the sub-channels to be assigned to the k-th user (i.e. k=1 to K).

Next, in step S41, each user sequentially selects one of the sub-channels according to a scheduling rule, wherein the scheduling rule may be Max-Min scheduling rule or Max Sum-Rate scheduling rule, and the kind of the scheduling rule is not used to limit the scope of the present invention.

In step S42, determine one of the users who has a right of selecting the non-assigned sub-channels according to the assigned capacities and the capacity ratio constraints of the users, and then the user who has the right of selecting the non-assigned sub-channels selects one of the non-assigned sub-channels according to the scheduling rule.

In step S43, if the number of the sub-channels assigned to the k-th user is equal to preset assigned sub-channel number $N_k$, the k-th user exits the competition of determining the right of selecting the non-assigned sub-channels to the one of the users, and the next step S44 will be executed. Otherwise, go back to step S42.

In step S44, determine if the number of the sub-channels assigned to the all of the users is equal to the summation of their preset assigned sub-channel numbers. If the number of the sub-channels assigned to the all of the users is equal to the summation of their preset assigned sub-channel numbers, the step S45 will be executed. Otherwise, go back to step S42.

In step S45, determine the user who has the right of selecting the non-assigned sub-channels according to each of the assigned capacities and capacity ratio constraints of the users, and then the user who has the right of selecting the non-assigned sub-channels selects one of the non-assigned sub-channels according to the scheduling rule. Step S45 is repeated until all of the sub-channels are assigned to the users.

In FIGS. 2A through 2C, the sub-channels are assigned in the point of user-orientation. Since the sub-channels are assigned in the point of user-orientation, the methods determine the user who has the right of selecting the non-assigned sub-channels according the results of the assigned sub-channels of the users. Further, in the case, N>K, each user has the relatively high selecting order to select the sub-channel, and it is adaptive for allocating the resource to the users when the data sizes of the required data transmissions of the users are different. However, the conditions of the N sub-channels seen by each user are fixed. Except the selection of the sub-channel first to be assigned is the statistical selection of the N independent identical distributions, the other selections depends on each other, and therefore the scheduling gain may be reduced.

Figure 3A:
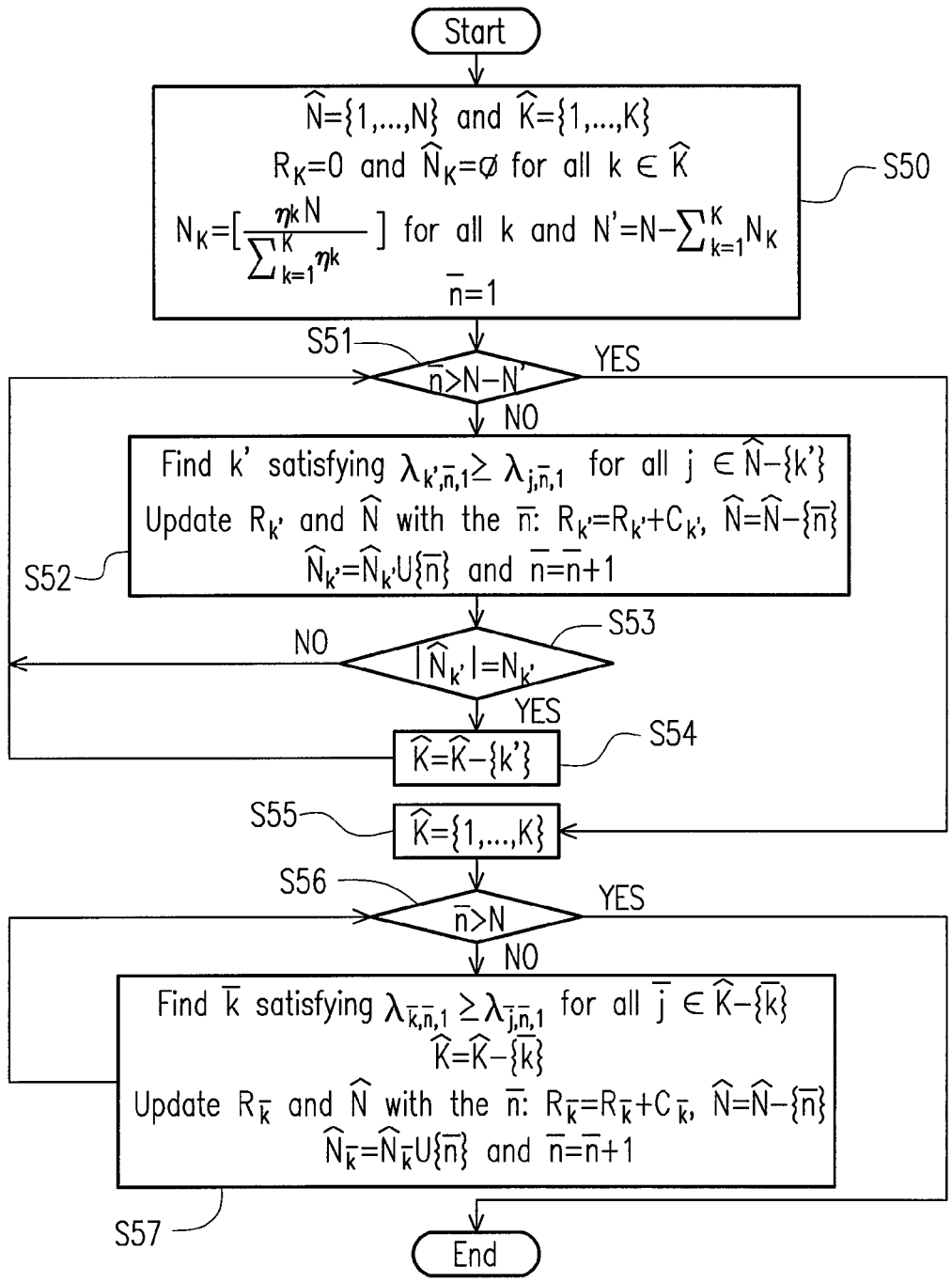
FIG. 3A is the flow chart of step S10 according to another one exemplary example of the present invention.

Referring to FIG. 3A, FIG. 3A is the flow chart of step S10 according to another one exemplary example of the present invention. In this exemplary example, the step S10 is implemented by the point of the sub-channel oriented sub-channel allocation algorithm with Max-Min scheduling rule. However the exemplary example provided by FIG. 3A is not used to limit the scope of the invention.

In step S50, a preset assigned sub-channel number $N_k$ is assigned to the k-th user according the capacity ratio constraint, wherein the preset assigned sub-channel number $N_k$ represents the number of the sub-channels to be assigned to the k-th user. It is noted that $N_k$ may be determined by equation (1) but not used to limit the scope of the present invention. In step S50, the set, $\hat{N}=\{1,2,\ldots,N\}$, represents the set of the members of the sub-channels, and the set, $\hat{K}=\{1,2,\ldots,K\}$ represents the set of the members of the users. At the beginning, the capacity of k-th user $R_k$ is initially set to be 0 (i.e. $R_k=0$), and the set of the members of the sub-channels assigned to the k-th user $\hat{N}_k$ is initially set to be null (i.e. $\hat{N}_k=\phi$). After all of the preset assigned sub-channel numbers $N_k$ are assigned to the users, a preset residual sub-channel number N' is calculated by equation (2) but not used to limit the scope of the present invention, and then the counter number $\bar{n}$ is initially set to be 1.

Next, in step S51, judge if the count number $\bar{n}$ is larger than the summation of the preset assigned sub-channel numbers (i.e. $\bar{n} \geq N-N'$). If the count number $\bar{k}$ is larger than the summation of the preset assigned sub-channel numbers, step S55 will be executed. Otherwise, step S52 will be executed.

In steps S51 through S54, each sub-channel is sequentially assigned to one of the users, in which the user has the maximal weakest eigenmode of the MIMO system when using the sub-channel, and then the capacity of k'-th user $R_{k'}$, the sets $\hat{N}$ and $\hat{N}_{k'}$ are updated. If the number of the sub-channels assigned to the k'-th user is equal to preset assigned sub-channel number $N_{k'}$, the k'-th user exits the competition, and the non-assigned sub-channels will not be assigned to the k'-th user in the loop of steps S51 through S54.

In step S52, find a number k' satisfying $\lambda_{k',\bar{n},1} \geq \lambda_{j,\bar{n},1}$ for all j, in which j belongs to the set $\hat{K}$ removing the number k' (i.e. $j \in \hat{K}-\{k'\}$). The capacity of k'-th user $R_{k'}$ and the sets $\hat{N}$ and $\hat{N}_{k'}$ are updated with the number $\bar{n}$. The k'-th user has the maximal weakest eigenmode of the MIMO system when the $\bar{n}$-th sub-channel is assigned to the k'-th user. Thus the capacity of k'-th user $R_{k'}$ is equal to the previous $R_{k'}$ plus $C_{k'}$ (i.e. $R_{k'}=R_{k'}+C_{k'}$), the count number $\bar{n}$ is added in the set of the members of the sub-channels assigned to the k'-th user $\hat{N}_{k'}$ (i.e. $\hat{N}_{k'}=\hat{N}_{k'} \cup \{\bar{n}\}$), and the count number $\bar{n}$ is removed from the set of the members of the sub-channels $\hat{N}$ (i.e. $\hat{N}-\{\bar{n}\}$). Wherein the capacity assigned to the k'-th user is expressed as $$C_{k'} = \sum_{i=1}^{M_t} \log\left(1 + \frac{g_{k'} P_{k',\bar{n}} \lambda_{k',\bar{n},i}}{M_t \sigma^2}\right).$$

In step S52, finally the counter number $\bar{n}$ is increased by 1 (i.e. $\bar{n}=\bar{n}+1$). After step S52 is executed, step S53 is executed.

In step S53, determine whether the number of the sub-channels assigned to the k'-th user is equal to preset assigned sub-channel number $N_{k'}$. If the number of the sub-channels assigned to the k'-th user is equal to preset assigned sub-channel number $N_{k'}$ (i.e. $|\hat{N}_{k'}|=N_{k'}$), step S54 will be executed; otherwise the method provided in the exemplary example will go back to step S52.

In step S54, remove the number k' from the set $\hat{K}$ (i.e. $\hat{K}-\{k'\}$), and thus the k'-th user exits the competition. The non-assigned sub-channels will not be assigned to the k'-th user in the loop of steps S51 through S54.

After each of the numbers of the sub-channels assigned to the each of the users is equal to the preset assigned sub-channel number, step S55 is executed. In steps S55 through S57, assign the residual sub-channels to the K users. In step S55 initialize the set of the members of the users $\hat{K}$, in which $\hat{K}=\{1, \ldots, K\}$. Then in step S56, determine whether the counter number $\bar{n}$ is larger than N. If the counter number $\bar{n}$ is larger than N, the sub-channel allocation will be completed. Otherwise, step S57 will be executed.

In step S57, find a number $\bar{k}$ satisfying $\lambda_{\bar{k},\bar{n},1} \geq \lambda_{\bar{j},\bar{n},1}$ for all $\bar{j}$, in which $\bar{j}$ belongs to the set $\hat{K}$ removing the number k' (i.e. $\bar{j} \in \hat{K}-\{\bar{k}\}$). Then the number $\bar{k}$ is removed from the set of the members of the users $\hat{K}$ (i.e. $\hat{K}-\{\bar{k}\}$). The capacity of $\bar{k}$-th user $R_{\bar{k}}$ and the sets $\hat{N}$ and $\hat{N}_{\bar{k}}$ are updated with counter number $\bar{n}$. The $\bar{k}$-th user has the maximal weakest eigenmode of the MIMO system when the $\bar{n}$-th sub-channel is assigned to the $\bar{k}$-th user. Thus the capacity of $\bar{k}$-th user $R_{\bar{k}}$ is equal to the previous $R_{\bar{k}}$ plus $C_{\bar{k}}$ (i.e. $R_{\bar{k}}=R_{\bar{k}}+C_{\bar{k}}$), the count number $\bar{n}$ is added in the set of the members of the sub-channels assigned to the $\bar{k}$-th user $\hat{N}_{\bar{k}}$ (i.e. $\hat{N}_{\bar{k}}=\hat{N}_{\bar{k}} \cup \{\bar{n}\}$), and the count number $\bar{n}$ is removed from the set of the members of the sub-channels $\hat{N}$ (i.e. $\hat{N}-\{\bar{n}\}$). In step S57, finally the counter number $\bar{n}$ is increased by 1 (i.e. $\bar{n}=\bar{n}+1$). After step S57 is executed, go back to step S56.

In the loop of steps S56 and S57, it is noted that each user at most get one of the residual sub-channels which are non-assigned in the loop of steps S51 through S54. Therefore, the capacity ratio constraints may be maintained. Differing from FIG. 2A, each sub-channel is assigned to the user that has the maximal weakest eigenmode link. Therefore, the method provided by FIG. 3A may not allocate the sub-channel according to the results of the assigned sub-channels of the users.

Figure 3B:
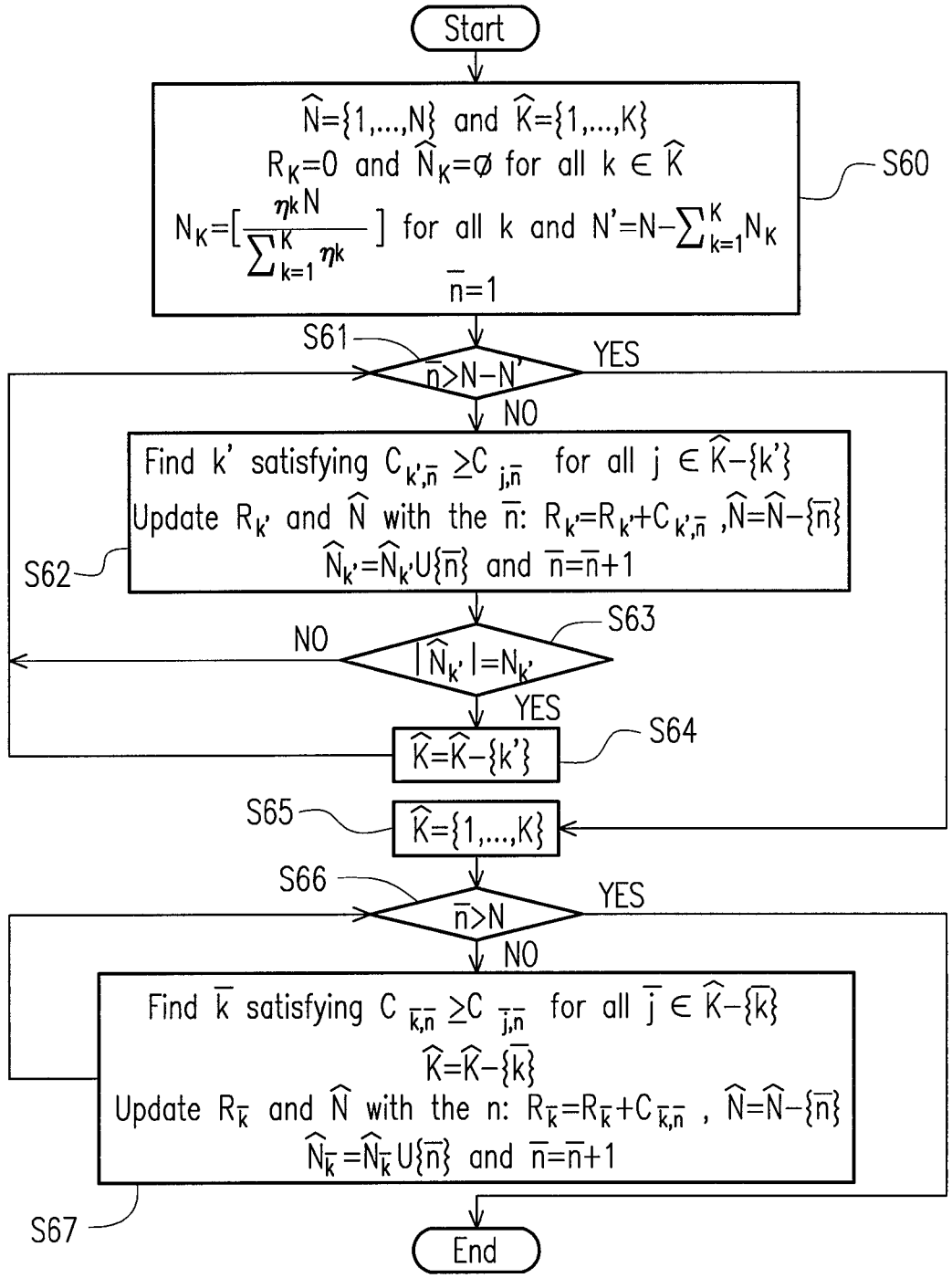
FIG. 3B is the flow chart of step S10 according to another one exemplary example of the present invention.

Referring to FIG. 3B, FIG. 3B is the flow chart of step S10 according to another one exemplary example of the present invention. Differing from FIG. 3A, the step S10 is implemented by the point of the sub-channel oriented sub-channel allocation algorithm with Max Sum-Rate scheduling rule. However the exemplary example provided by FIG. 3B is not used to limit the scope of the invention. Steps S60, S61, S63, and S64 through S66 are same as steps S50, S61, S53, and S54 through S56 respectively, and the details thereof are not described again herein. As stated above the differences between FIGS. 3A and 3B are scheduling rules. FIG. 3A adapts Max-Min scheduling rule, but FIG. 3B adapts Max Sum-Rate scheduling rule.

In step S62, find a number k' satisfying $C_{k',\bar{n}} \geq C_{j,\bar{n}}$ for all j, in which j belongs to the set $\hat{K}$ removing the number k' (i.e. $j \in \hat{K}-\{k'\}$). The capacity of k'-th user $R_{k'}$ and the sets $\hat{N}$ and $\hat{N}_{k'}$ are updated with the number $\bar{n}$. The k'-th user has the maximal capacity of the MIMO system when the $\bar{n}$-th sub-channel is assigned to the k'-th user. Thus the capacity of k'-th user $R_{k'}$ is equal to the previous $R_{k'}$ plus $C_{k',\bar{n}}$ (i.e. $R_{k'}=R_{k'}+C_{k',\bar{n}}$), the count number $\bar{n}$ is added in the set of the members of the sub-channels assigned to the k'-th user $\hat{N}_{k'}$ (i.e. $\hat{N}_{k'}=\hat{N}_{k'} \cup \{\bar{n}\}$), and the count number $\bar{n}$ is removed from the set of the members of the sub-channels $\hat{N}$ (i.e. $\hat{N}-\{\bar{n}\}$). Wherein the capacity assigned to the k'-th user is expressed as $$C_{k',\bar{n}} = \sum_{i=1}^{M_t} \log\left(1 + \frac{g_{k'} P_{k',\bar{n}} \lambda_{k',\bar{n},i}}{M_t \sigma^2}\right).$$

In step S62, finally the counter number $\bar{n}$ is increased by 1 (i.e. $\bar{n}=\bar{n}+1$). After step S62 is executed, step S63 is executed.

In step S67, find a number $\bar{k}$ satisfying $C_{\bar{k},\bar{n}} \geq C_{\bar{j},\bar{n}}$ for all $\bar{j}$, in which $\bar{j}$ belongs to the set $\hat{K}$ removing the number k' (i.e. $\bar{j} \in \hat{K}-\{\bar{k}\}$). Then the number $\bar{k}$ is removed from the set of the members of the users $\hat{K}$ (i.e. $\hat{K}-\{\bar{k}\}$). The capacity of $\bar{k}$-th user $R_{\bar{k}}$ and the sets $\hat{N}$ and $\hat{N}_{\bar{k}}$ are updated with counter number $\bar{n}$. The $\bar{k}$-th user has the maximal capacity of the MIMO system when the $\bar{n}$-th sub-channel is assigned to the $\bar{k}$-th user. Thus the capacity of $\bar{k}$-th user $R_{\bar{k}}$ is equal to the previous $R_{\bar{k}}$ plus $C_{\bar{k},\bar{n}}$ (i.e. $R_{\bar{k}}=R_{\bar{k}}+C_{\bar{k},\bar{n}}$), the count number $\bar{n}$ is added in the set of the members of the sub-channels assigned to the $\bar{k}$-th user $\hat{N}_{\bar{k}}$ (i.e. $\hat{N}_{\bar{k}}=\hat{N}_{\bar{k}} \cup \{\bar{n}\}$), and the count number $\bar{n}$ is removed from the set of the members of the sub-channels $\hat{N}$ (i.e. $\hat{N}-\{\bar{n}\}$). In step S67, finally the counter number $\bar{n}$ is increased by 1 (i.e. $\bar{n}=\bar{n}+1$). After step S67 is executed, go back to step S66.

Figure 3C:
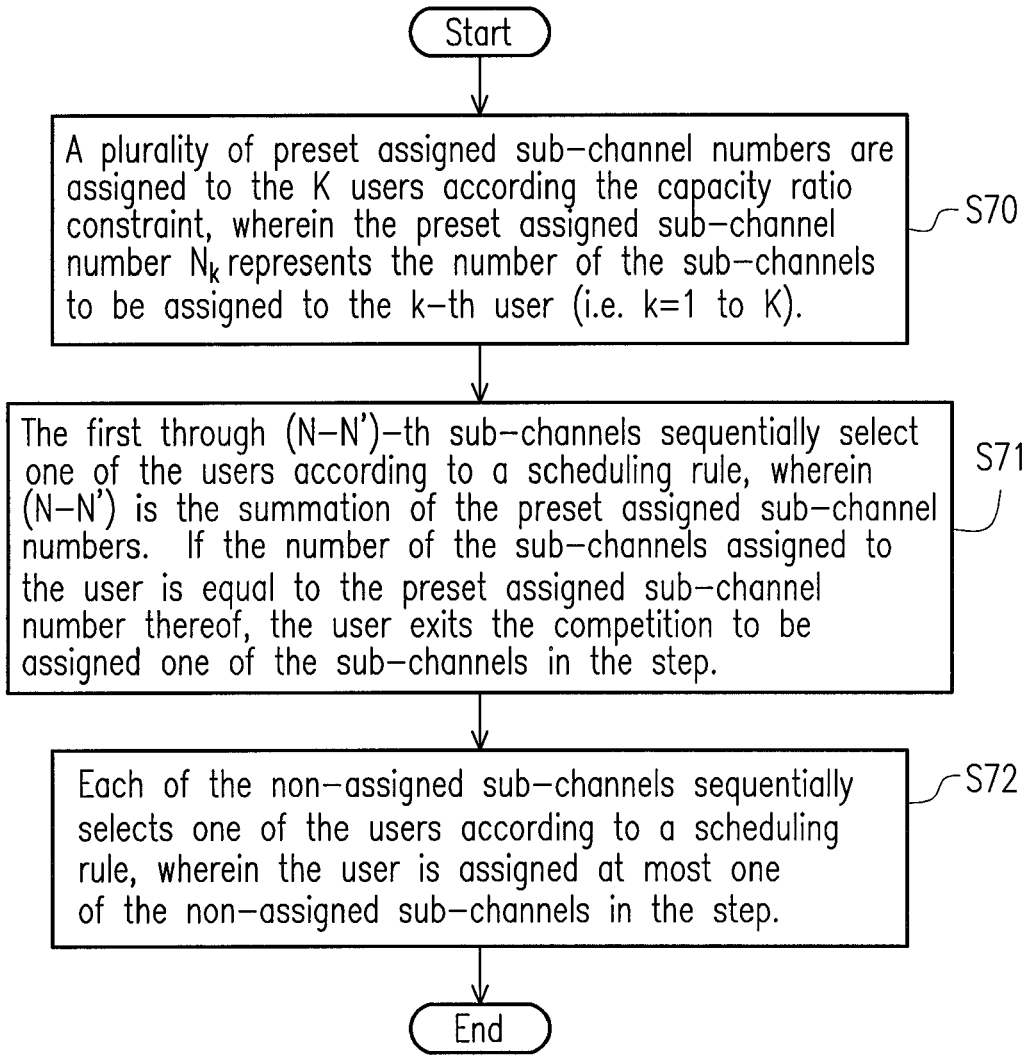
FIG. 3C is the flow chart of step S10 according to another one exemplary example of the present invention.

According to the above two exemplary examples, the sub-channels are assigned in the point of sub-channel-orientation. Referring to FIG. 3C, FIG. 3C is the flow chart of step S10 according to another one exemplary example of the present invention. It is noted that the scheduling rules are not limited in the FIGS. 3A and 3B, and FIG. 3C is a general flow chart of step S10 summarized by FIGS. 3A and 3B.

In step S70, a plurality of preset assigned sub-channel numbers are assigned to the K users according the capacity ratio constraints, wherein the preset assigned sub-channel number $N_k$ represents the number of the sub-channels to be assigned to the k-th user (i.e. k=1 to K).

In step S71, the first through (N-N')-th sub-channels sequentially select one of the users according to a scheduling rule, wherein (N-N') is the summation of the preset assigned sub-channel numbers. If the number of the sub-channels assigned to the user is equal to the preset assigned sub-channel number thereof, the user exits the competition to be assigned one of the sub-channels in step S71.

In step S72, each of the non-assigned sub-channels sequentially selects one of the users according to a scheduling rule, wherein the user is assigned at most one of the non-assigned sub-channels in step S72.

Differing from FIGS. 2A through 2C, the methods provided by FIGS. 3A through 3C are sub-channel oriented. Therefore, each sub-channel is sequentially assigned to its corresponding user, and the selection of each sub-channel to the users is the statistical selection of K independent identical distributions. Hence it is adaptive for the resource allocation of equal data sizes of the required data transmission of the users. However the methods provided by FIGS. 3A through 3C may not assign the sub-channels to the users according the assigned capacities of the users. Although each selection of the sub-channel is an independent identical distribution with statistical properties, the selecting order may reduced by 1 when the number of the sub-channels assigned to the user is equal to its preset assigned sub-channels number.

Figure 4A:
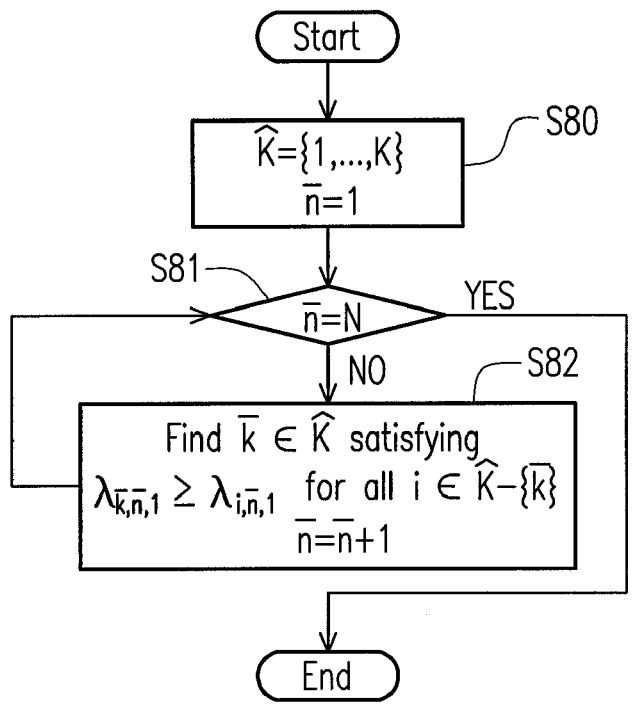
FIG. 4A is the flow chart of step S10 according to another one exemplary example of the present invention when the capacity ratios of the users are the same.
Figure 4B:
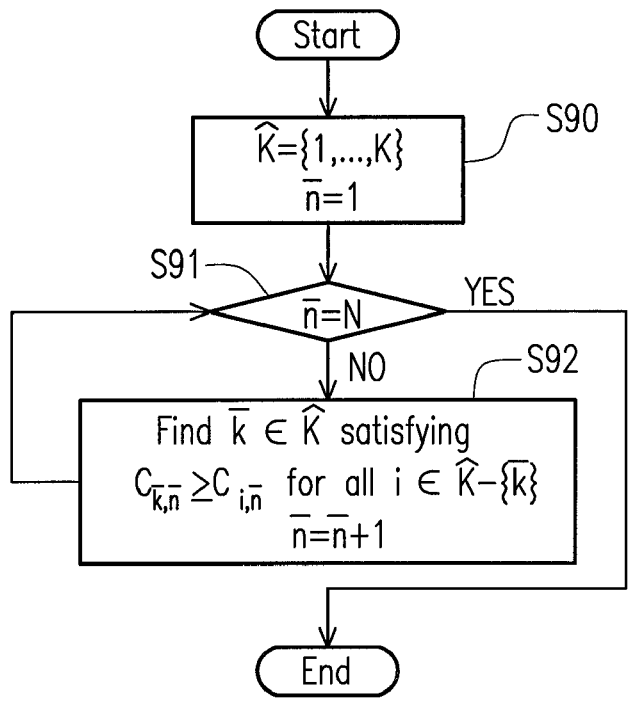
FIG. 4B is the flow chart of step S10 according to another one exemplary example of the present invention when the capacity ratios of the users are the same.
Figure 4C:
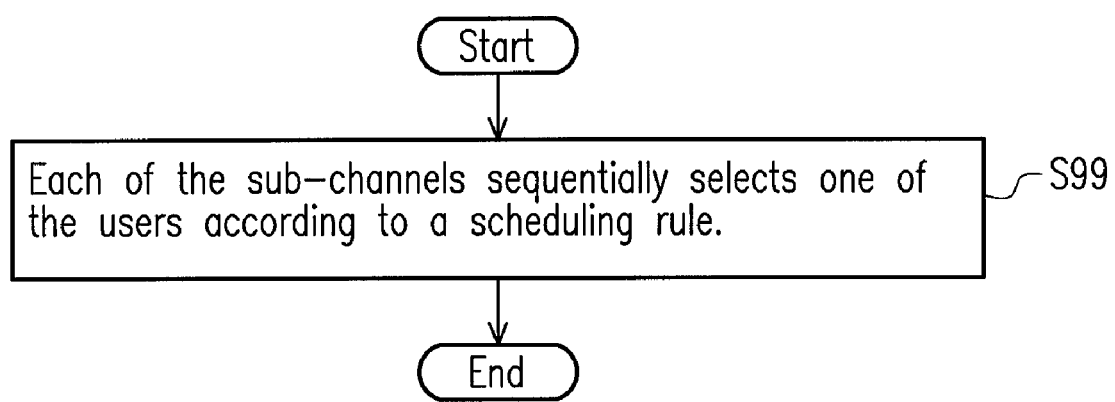
FIG. 4C is the flow chart of step S10 according to another one exemplary example of the present invention when the capacity ratios of the users are the same.

It is noted that when the sizes of the data transmission of the users are the same (i.e. the capacity ratios are the same), the methods provided by FIGS. 3A through 3C are reduced as FIGS. 4A through 4C respectively.

Referring to FIG. 4A, FIG. 4A is the flow chart of step S10 according to another one exemplary example of the present invention when the capacity ratios of the users are the same. In step S80, the set of the members of the users $\hat{K}$ is initialized as $\hat{K}=\{1, \ldots, K\}$, and the counter number $\bar{n}$ is set to be 1. In step S81, determine if the count number $\bar{n}$ is equal to N. If the count number $\bar{n}$ is equal to N, the sub-channels allocation ends. Otherwise, go to step S82.

In step S82, find a number $\bar{k}$ satisfying $\lambda_{\bar{k},\bar{n},1} \geq \lambda_{i,\bar{n},1}$ for all i, in which i belongs to the set $\hat{K}$ removing the number $\bar{k}$ (i.e. $i \in \hat{K} - \{\bar{k}\}$). The $\bar{k}$-th user has the maximal weakest eigenmode of the MIMO system when the $\bar{n}$-th sub-channel is assigned to the $\bar{k}$-th user. Thus the $\bar{n}$-th sub-channel is assigned to the $\bar{k}$-th user, and the count number is increased by 1.

In the loop of steps S81 and S82, each of the sub-channels selects one of the users having the maximal weakest eigenmode when the sub-channel is assigned to the users. It is noted that the selecting order of each user selected by the sub-channel is K. Differing from the point of the user-orientation method, the method is more adaptive when the data sizes of data transmissions of the users are the same.

Referring to FIG. 4B, FIG. 4B is the flow chart of step S10 according to another one exemplary example of the present invention when the capacity ratios of the users are the same.

Steps S90 and S91 are same as steps S80 and S81 and not described herein again. The differences of FIGS. 4A and 4B are the scheduling rules. FIG. 4A adapts Max-Min scheduling rule, while FIG. 4C adapts Max Sum-Rate scheduling rule.

Referring to FIG. 4C, FIG. 4C is the flow chart of step S10 according to another one exemplary example of the present invention when the capacity ratios of the users are the same. FIG. 4C is a general flow chart of step S10 summarized by FIGS. 4A and 4B. In step S99, each of the sub-channels sequentially selects one of the users according to a scheduling rule.

The implementations of step S10 has been described as stated above. Now please refer to FIG. 1 again. After the sub-channels allocation has been completed, now in step S12, the power for each transmission link is calculated and determined.

Since the sub-channels allocation has been completed (i.e. $I_{k,n}$ is solved), for the constraint of fixed power, the problem to maximize the system capacity is modeled as the following equations:

$$\max_{P_{k,n}} \frac{1}{N} \sum_{k=1}^{K} \sum_{n \in \hat{N}_k} \sum_{i=1}^{M_t} \log\left(1 + \frac{g_k P_{k,n} \lambda_{k,n,i}}{M_t \sigma^2}\right)$$

$$\text{subject to } C1: \sum_{k=1}^{K} \sum_{n \in \hat{N}_k} P_{k,n} \leq P_{max}$$

$$C2: P_{k,n} \geq 0 \text{ for all } k, n$$

$$C3: \hat{N}_k \text{ disjoint for all } k$$

$$C4: \bigcup_{k=1}^{K} \hat{N}_k \subseteq \{1, \ldots, N\}$$

$$C5: C_1 : C_2 : \ldots : C_K = \eta_1 : \eta_2 : \ldots : \eta_K,$$

wherein the set $\hat{N}_k$ is determined in step S10. Now by the optimization of Lagrangian multiplier, the Largragian function of the above problem is expressed as $$L = -\frac{1}{N} \sum_{k=1}^{K} \sum_{n \in \hat{N}_k} \sum_{i=1}^{M_t} \log\left(1 + \frac{g_k P_{k,n} \lambda_{k,n,i}}{M_t \sigma^2}\right) +$$

$$\mu_1 \left(\sum_{k=1}^{K} \sum_{n \in \hat{N}_k} P_{k,n} - P_{max}\right) + \sum_{k=2}^{K} \theta_k \left(\sum_{n \in \hat{N}_1} \sum_{i=1}^{M_t} \log\left(1 + \frac{g_1 P_{1,n} \lambda_{1,n,i}}{M_t \sigma^2}\right) - \right.$$

$$\left. \frac{\eta_1}{\eta_k} \sum_{n \in \hat{N}_k} \sum_{i=1}^{M_t} \log\left(1 + \frac{g_k P_{k,n} \lambda_{k,n,i}}{M_t \sigma^2}\right)\right) + \sum_{k=1}^{K} \sum_{n \in \hat{N}_k} \zeta_{k,n} P_{k,n},$$

wherein $\mu_1$, $\theta_k$ ($2 \leq \theta_k \leq K$), and $\zeta_k$ ($1 \leq k \leq K$; $n \in \hat{N}_k$) are Largrangian multipliers. According to the optimization rule, the optimal solution should be satisfying the condition of Kurush-Kuhn-Tucker (KKT), that is satisfying the following equations:

$$\frac{\partial L}{\partial P_{k,n}} = 0 \qquad (3)$$

$$\mu_1, \zeta_{k,n} \geq 0 \qquad (4)$$

-continued $$\mu_1\left(\sum_{k=1}^{K}\sum_{n\in\hat{N}_k}P_{k,n}-P_{max}\right)=0 \quad (5)$$

$$\zeta_{k,n}P_{k,n}=0. \quad (6)$$

As described above, since step S10 has assigned the sub-channels to the users, the MU-MIMO-OFDM system is operated at high gain's condition after scheduling procedure. Therefore, in the condition, log(1+x) is approached to log(x). Under this assumption and by the condition of KKT of equations (3), (4), and (6), the relation equations are obtained as $$\frac{\partial L}{\partial P_{1,n}}=\mu_1-\frac{M_t}{P_{1,n}}\left(\frac{1}{N}-\sum_{k=2}^{K}\theta_k\right)=0 \quad (7)$$

for $n\in\hat{N}_1$ $$\frac{\partial L}{\partial P_{k,n}}=\mu_1-\frac{M_t}{P_{k,n}}\left(\frac{1}{N}-\theta_k\frac{\eta_1}{\eta_k}\right)=0 \quad (8)$$

for $k=2,3,\ldots,K$ and $n\in\hat{N}_k$

From equation (7), for the first user (i.e. k=1), the values of power of any twos of its assigned sub-channels are the same. That is, supposing the n-th and m-th sub-channel are assigned to the first user (i.e. n,m∈$\hat{N}_1$), and their power are equal to each other (i.e. $P_{1,n}=P_{1,m}$) Similarly, from equation (8), for the k-th user (i.e. k=2 through K), the values of power of any twos of its assigned sub-channels are the same. That is, supposing the n-th and m-th sub-channel are assigned to the k-th user (i.e. n,m∈$\hat{N}_k$), and their power are equal to each other (i.e. $P_{k,n}=P_{k,m}$). Therefore, for each user, the values of power of their assigned sub-channel are the same, and the power of the k-th user is expressed as $$P_k=|\hat{N}_k|P_{k,n}, \text{ for } n\in\hat{N}_k,$$

wherein, |$\hat{N}_k$| is the number of the sub-channels assigned to the k-th user. Accordingly, the solutions of the optimization problem are reduced to solve the K allocations of user power $\{P_k\}_{k=1}^{K}$ instead of solving the N allocations of the sub-channel power $P_{k,n}$.

Now considering the capacity ratio constraints in the above results, a relative equation is derived as $$\sum_{n\in\hat{N}_1}\sum_{i=1}^{M_t}\log\left(1+\frac{g_1P_1\lambda_{1,n,i}}{M_t|\hat{N}_1|\sigma^2}\right)=\frac{\eta_1}{\eta_k}\sum_{n\in\hat{N}_k}\sum_{i=1}^{M_t}\log\left(1+\frac{g_kP_k\lambda_{k,n,i}}{M_t|\hat{N}_k|\sigma^2}\right),$$

and then the power of the k-th user is derived as $$P_k=\frac{M_t|\hat{N}_1|\sigma^2g_k^{-1}}{(M_t|\hat{N}_1|\sigma^2g_1^{-1})^{|\hat{N}_1|\eta_k/|\hat{N}_k|\eta_1}}\left(\frac{E_1^{\frac{\eta_k}{\eta_1}}}{E_k}\right)^{\frac{1}{M_t|\hat{N}_k|}}P_1^{\frac{|\hat{N}_1|\eta_k}{|\hat{N}_k|\eta_1}} \quad (9)$$

for $k=2,3,\ldots K,$ in which $E_k$ is expressed as $$E_k=\Pi_{n\in\hat{N}_k}\Pi_{i=1}^{M_t}\lambda_{k,n,i}.$$

The power limitation of the MU-MIMO-OFDM system is $$\Sigma_{k=1}^{K}P_k=P_{max} \quad (10).$$

From equations (9) and (10), the power of the k-th user $P_k$ can be solved (by Newton's root-finding method which is not used to limit the scope of the present invention). When |$\hat{N}_1$|:|$\hat{N}_2$|:...:|$\hat{N}_K$|≅$\eta_1$:$\eta_2$:...:$\eta_k$, equation (9) is reduced as $$P_k=\frac{|\hat{N}_k|g_1}{|\hat{N}_1|g_k}\left(\frac{E_1^{\frac{\eta_k}{\eta_1}}}{E_k}\right)^{\frac{1}{M_t|\hat{N}_k|}}P_1 \text{ for } k=2,3,\ldots K. \quad (11)$$

Next, substitute equation (11) into equation (10) and derived the relative equation as $$P_1\left(1+\sum_{j=2}^{K}\frac{|\hat{N}_j|g_1}{|\hat{N}_1|g_j}\left(\frac{E_1^{\frac{\eta_j}{\eta_1}}}{E_j}\right)^{\frac{1}{M_t|\hat{N}_j|}}\right)=P_{max},$$

and then obtain the values of power of the first user and the k-th user (k=2, 3, . . . , K) as equations (12) and (13). Equations (12) and (13) are expressed as $$P_1=P_{max}\bigg/\left(1+\sum_{j=2}^{K}\frac{|\hat{N}_j|g_1}{|\hat{N}_1|g_j}\left(\frac{E_1^{\frac{\eta_j}{\eta_1}}}{E_j}\right)^{\frac{1}{M_t|\hat{N}_j|}}\right) \quad (12)$$

$$P_k=\frac{P_{max}\frac{|\hat{N}_k|g_1}{|\hat{N}_1|g_k}\left(\frac{E_1^{\frac{\eta_k}{\eta_1}}}{E_k}\right)^{\frac{1}{M_t|\hat{N}_k|}}}{\left(1+\sum_{j=2}^{K}\frac{|\hat{N}_j|g_1}{|\hat{N}_1|g_j}\left(\frac{E_1^{\frac{\eta_j}{\eta_1}}}{E_j}\right)^{\frac{1}{M_t|\hat{N}_j|}}\right)}, \quad (13)$$

and equations (12) and (13) are simple linear solutions.

It is intuitive the above problem may be solve by exhaustive search to get the ideal solution. However there are $K^N$ possible allocations of the sub-channels and values of power, and its complexity is $O(K^N)$. The methods provided by the exemplary examples first allocate the sub-channels to the users, and then allocate the power to each user, and the values of power of the sub-channels of the same user are the same. Therefore, the complexities of the user-oriented scheduling algorithm of the methods provided by FIG. 2A~2C are O(KN log$_2$N), and the complexities of the sub-channel-oriented scheduling algorithm of the methods provided by FIG. 3A~3C are O(KN).

Figure 5:
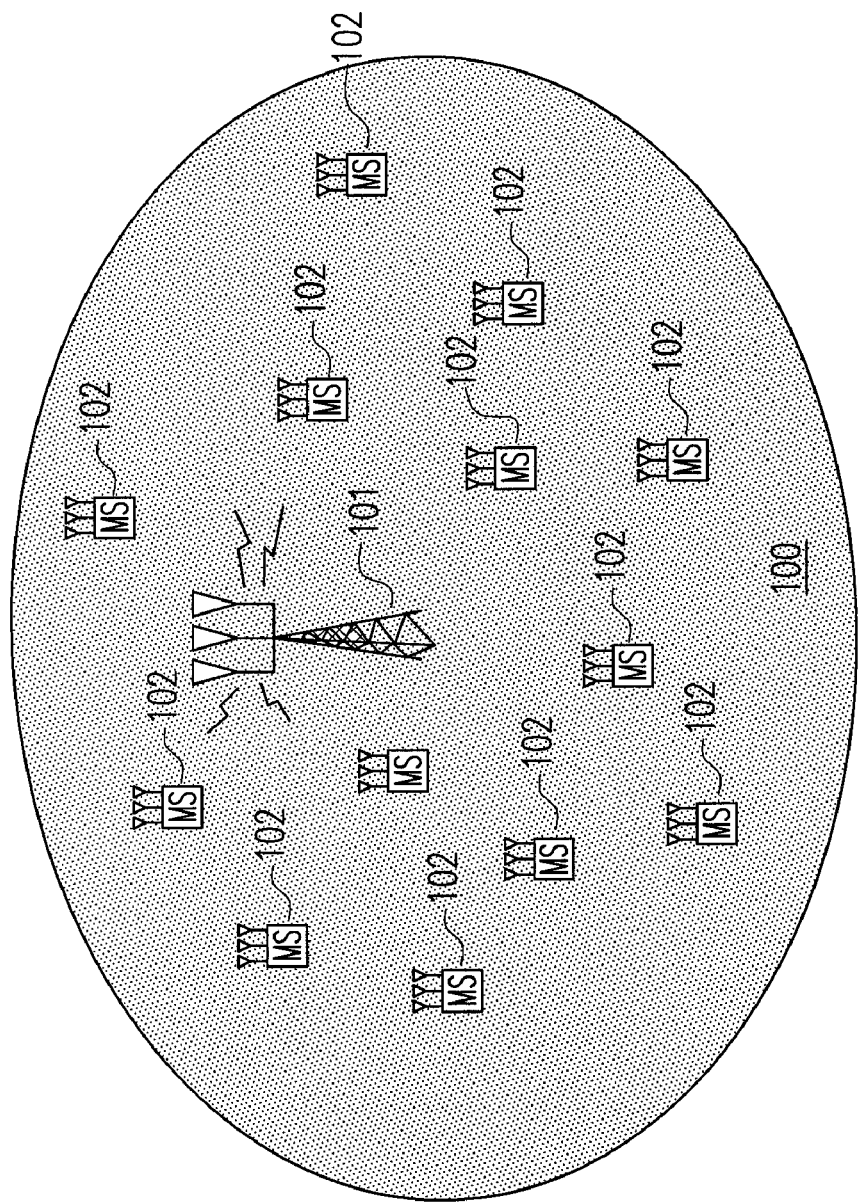
FIG. 5 is a schematic diagram showing a MU-MIMO-OFDM system 100.

Referring to FIG. 5, FIG. 5 is a schematic diagram showing a MU-MIMO-OFDM system 100. The MU-MIMO-OFDM has a base station 101 with multiple antennae, and a plurality of users 102 with multiple antennae. In this scheme, the base station 101 must assign the sub-channels and the values of power to each user 102, therefore a resource allocation apparatus is installed in the base station 101. The resource allocation apparatus executes the method provided in FIG. 1 to assign the sub-channels and the values of power to each user 102. Wherein, step S10 of FIG. 1 may be implemented by the exemplary examples provided by FIG. 2A through FIG. 4C for different conditions and different requirements.

Figure 6:
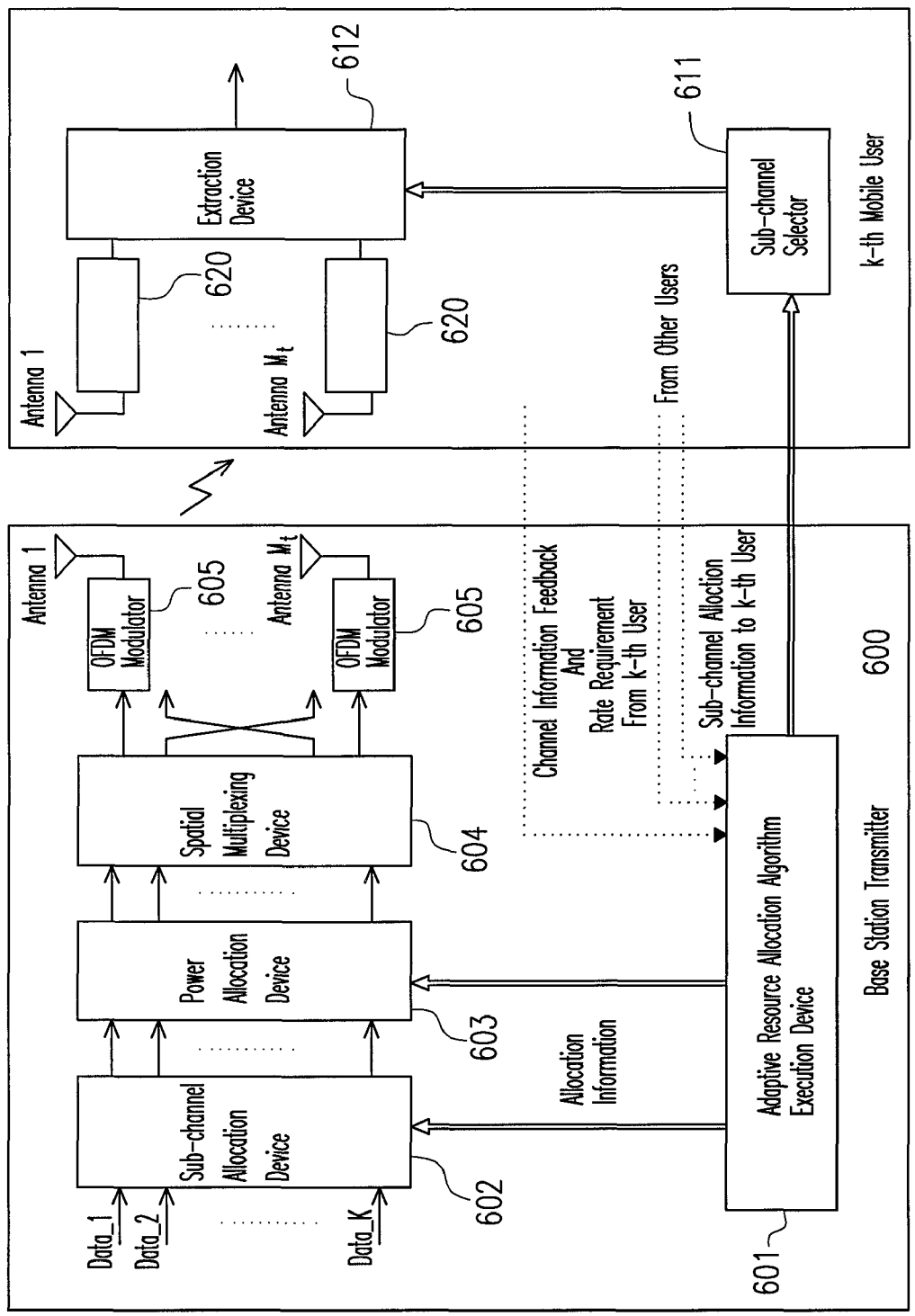
FIG. 6 is a block diagram showing the application of the apparatus for resource allocation in the base station transmitter 600.

Referring to FIG. 6, FIG. 6 is a block diagram showing the application of the resource allocation apparatus in the base station transmitter 600. The resource allocation apparatus is an adaptive resource allocation algorithm execution device 601 which executes the method provided in FIG. 1 to assign the sub-channels and the values of power to each user. The adaptive resource allocation algorithm execution device 601 may comprise a power resource allocation apparatus and a sub-channel resource allocation apparatus, but this implementation of the resource allocation apparatus is not used to limit the scope of the present invention. The sub-channel resource allocation apparatus is used to execute step S10 of FIG. 1, and the power resource allocation apparatus is used to execute step S12 of FIG. 1. Wherein, step S10 of FIG. 1 may be implemented by the exemplary examples provided by FIG. 2A through FIG. 4C for different conditions and different requirements. As stated above, when executing the method provided in FIG. 1, some information is required, such as channel information, feedback information and rate requirement of each user. The channel or feedback information may comprise the weakest eigenmode gains or the estimated capacity values of all users across all sub-channels for different conditions and different requirements. The rate requirement of each user may be the predetermined required proportional capacity among each user.

It is noted that the required channel or feedback information may be determined according to the scheduling rule. When the scheduling rule is Max-Min scheduling rule, the required channel or feedback information must have the weakest eigenmode gains of all users across all sub-channels. When the scheduling rule is Max Sum-Rate rule, the required channel or feedback information must have the estimated capacity values of all users across all sub-channels.

After the adaptive resource allocation algorithm execution device 601 determines the allocation of the sub-channels of the users and the power of the users. The adaptive resource allocation algorithm execution 601 outputs the allocation information having the sub-channel allocation information and power allocation information to the sub-channel allocation device 602 and power allocation device 603 in the base station transmitter 600.

The sub-channel allocation device 602 receives the data Data_1~Data_K to be transmitted to the first user through the K-th user respectively, and assigns the data Data_1~Data_K on the corresponding sub-channels according to the sub-channel allocation information. The power allocation device 603 assigns the power of each sub-channel according to power allocation information, and the spatial multiplexing device 604 next assigns the data Data_1~Data_K to be transmitted via which one of the antennae. Before the data Data_1~Data_K is transmitted by the antennae, the data Data_1~Data_K are modulated by the OFDM modulators 605.

The user such as a k-th mobile user may have a sub-channel selector to receive the sub-channel allocation information of the k-th user. The sub-channel selector indicates the extraction device 612 to extract the data which are received via the antennae and demodulated by the OFDM demodulator 620 according to sub-channel allocation information of the k-th user. Therefore the data received via the antennae can be extracted precisely. Though the application of the resource allocation apparatus in the base station transmitter 600 is described above, it is not used to limit the application of the resource allocation apparatus.

Accordingly, compared to the conventional resource allocation methods and apparatuses, the resource allocation methods and apparatuses provided by the above exemplary examples have the lower complexity. Further, the resource allocation methods and apparatuses provided by the above exemplary examples can be applied to the MU-MIMO-OFDM system, which the sizes of data transmissions of different users may be different. When the method adapts the Max-Min scheduling rule, the coverage ranges of the MU-MIMO-OFDM system are enhanced. When the method adapts the Max Sum-Rate scheduling rule, the capacities of the MU-MIMO-OFDM system are enhanced.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A resource allocation method for a MU-MIMO-OFDM system, the MU-MIMO-OFDM system has a plurality of users and sub-channels, and the method comprising:
(a) assigning, by a device, a plurality of preset assigned sub-channel numbers to the users according to a plurality of capacity ratio constraints, wherein the capacity ratio constraints are computed according to a number of the users, whether the n-th sub-channel is occupied by a k-th user, and all eigenmodes of the n-th sub-channel when the n-th sub-channel is assigned to the k-th user;
(b) each user sequentially selecting one of the sub-channels according to a scheduling rule;
(c) determining one of the users who has a right of selecting non-assigned sub-channels according to a plurality of assigned capacities and the capacity ratio constraints of the users, and then the user who has the right of selecting the non-assigned sub-channels selects one of the non-assigned sub-channels according to the scheduling rule, if a number of the sub-channels assigned to the user is equal to the preset assigned sub-channel number thereof, the user exits a competition of determining the right of selecting the non-assigned sub-channels in the step (c);
(d) determining if a number of the sub-channels assigned to the all of the users is equal to a summation of the preset assigned sub-channel numbers of all of the users;
(e) determining one of the users who has the right of selecting the non-assigned sub-channels according to the assigned capacities and capacity ratio constraints of the users, and then the user who has the right of selecting the non-assigned sub-channels selects one of the non-assigned sub-channels according to the scheduling rule; and
(f) repeating the step (e) until all of the sub-channels are assigned to the users.

2. The resource allocation method as claim 1, further comprising:
allocating power to each of the users according to a limit power of the MU-MIMO-OFDM system, and values of power of the sub-channels assigned to the same user are the same.

3. The resource allocation method as claim 1, wherein the scheduling rule is Max-Min rule, the user selects one of the sub-channels having a maximal weakest eigenmode, and the user who has the right of selecting the non-assigned sub-channels selects one of the non-assigned sub-channels having the maximal weakest eigenmode.

4. The resource allocation method as claim 1, wherein the scheduling rule is Max Sum-Rate rule, the user selects one of the sub-channels having a maximal capacity, and the user who has the right of selecting the non-assigned sub-channels selects one of the non-assigned sub-channels having the maximal capacity.

5. The resource allocation method as claim 1, wherein "determining one of the users who has the right of selecting the non-assigned sub-channels according to the assigned capacities and capacity ratio constraints of the users" is finding the user whose assigned capacity over the capacity ratio constraint thereof is minimal.

6. A resource allocation apparatus for a MU-MIMO-OFDM system, the MU-MIMO-OFDM system has a plurality of users and sub-channels, and the resource allocation apparatus comprising:

a sub-channel resource allocation apparatus;

wherein the sub-channel resource allocation apparatus first assigns a plurality of preset assigned sub-channel numbers to the users according a plurality of capacity ratio constraints, wherein the capacity ratio constraints are computed according to a number of the users, whether an n-th sub-channel is occupied by a k-th user, and all eigenmodes of the n-th sub-channel when the n-th sub-channel is assigned to the k-th user; next, the sub-channel resource allocation apparatus assigns one of the sub-channels to each user sequentially according to a scheduling rule; next, the sub-channel resource allocation apparatus assigns each of non-assigned sub-channels to one of the users who has a right of selecting the non-assigned sub-channels according to the scheduling rule until a number of the sub-channels assigned to all of the users meets a summation of the preset assigned sub-channel numbers of all of the users; and next, the sub-channel resource allocation apparatus assigns each of the non-assigned sub-channels to one of the users who has a right of selecting the non-assigned sub-channels according to the scheduling rule until all the non-assigned sub-channels are assigned.

7. The resource allocation apparatus as claim 6, wherein the users who has a right of selecting the non-assigned sub-channels is determined according to a plurality of assigned capacities and the capacity ratio constraints of the users.

8. The resource allocation apparatus as claim 7, wherein the user who has the right of selecting the non-assigned sub-channels is the user whose assigned capacity over the capacity ratio constraint thereof is minimal among all of the users.

9. The resource allocation apparatus as claim 6, wherein the sub-channel resource allocation apparatus assigns the non-assigned sub-channels to the user whose number of the assigned sub-channels is not equal to the preset assigned sub-channel number until the number of the sub-channels assigned to all of the users meets the summation of the preset assigned sub-channel numbers of all of the users.

10. The resource allocation apparatus as claim 6 further comprising:

a power resource allocation apparatus, for allocating power to each of the users according to a limit power of the MU-MIMO-OFDM system, and values of power of the sub-channels assigned to the same user are the same.

11. The resource allocation apparatus as claim 6, wherein the scheduling rule is Max-Min rule, the user is assigned one of the sub-channels having a maximal weakest eigenmode, and the user who has the right of selecting the non-assigned sub-channels is assigned to one of the non-assigned sub-channels having the maximal weakest eigenmode.

12. The resource allocation apparatus as claim 6, wherein the scheduling rule is Max Sum-Rate rule, the user is assigned one of the sub-channels having a maximal capacity, and the user who has the right of selecting the non-assigned sub-channels is assigned one of the non-assigned sub-channels having the maximal capacity.

13. A resource allocation method for a MU-MIMO-OFDM system, the MU-MIMO-OFDM system has a plurality of users and sub-channels, and the method comprising:

(a) assigning, by a device, a plurality of preset assigned sub-channel numbers assigned to the users according to a plurality of capacity ratio constraints, wherein the capacity ratio constraints are computed according to a number of the users, whether an n-th sub-channel is occupied by a k-th user, and all eigenmodes of the n-th sub-channel when the n-th sub-channel is assigned to the k-th user;

(b) the first through x-th sub-channels sequentially and respectively selecting one of the users according to a scheduling rule, if a number of the sub-channels assigned to the user is equal to the preset assigned sub-channel number thereof, the user exits a competition to be assigned one of the sub-channels in the step (b), wherein x is a summation of the preset assigned sub-channel numbers; and (c) each of non-assigned sub-channels sequentially selecting one of the users according to a scheduling rule, wherein each of the users is assigned at most one of the non-assigned sub-channels in the step (c).

14. The resource allocation method as claim 13, further comprising:

allocating power to each of the users according to a limit power of the MU-MIMO-OFDM system, and values of power of the sub-channels assigned to the user are the same.

15. The resource allocation method as claim 13, wherein the scheduling rule is Max-Min rule, the sub-channel selects one of the users who has a maximal weakest eigenmode when the first through x-th sub-channels sequentially select one of the users according to the scheduling rule, and the non-assigned sub-channel selects one of the users who has a maximal weakest eigenmode when each of the non-assigned sub-channels sequentially selects one of the users according to the scheduling rule.

16. . The resource allocation method as claim 13, wherein the scheduling rule is Max Sum-Rate rule, the sub-channel selects one of the users who has a maximal capacity when the first through x-th sub-channels sequentially select one of the users according to the scheduling rule, and the non-assigned sub-channel selects one of the users who has a maximal capacity when each of the non-assigned sub-channels sequentially selects one of the users according to the scheduling rule.

17. A resource allocation apparatus for a MU-MIMO-OFDM system, the MU-MIMO-OFDM system has a plurality of users and sub-channels, and the resource allocation apparatus comprising:

a sub-channel resource allocation apparatus;

wherein the sub-channel resource allocation apparatus first assigns a plurality of preset assigned sub-channel numbers to the users according a plurality of capacity ratio constraints, wherein the capacity ratio constraints are computed according to a number of the users, whether an n-th sub-channel is occupied by a k-th user, and all eigenmodes of the n-th sub-channel when the n-th sub-channel is assigned to the k-th user; next, the sub-channel resource allocation apparatus sequentially assigns each of the first through x-th sub-channels to one of the users according to a scheduling rule, wherein x is a summation of the preset assigned sub-channel numbers;

and next, the sub-channel resource allocation apparatus assigns sequentially and respectively non-assigned sub-channels, which are not the first through x-th sub-channels, to the users according to a scheduling rule, wherein each of the users is assigned at most one of the non-assigned sub-channels.

18. The resource allocation apparatus as claim 17, wherein each of the first through x-th sub-channels is sequentially assigned to the one of user whose preset assigned sub-channel number is not equal to the number of the sub-channels assigned to the user.

19. The resource allocation apparatus as claim 17 further comprising:
a power resource allocation apparatus, for allocating power to each of the users according to a limit power of the MU-MIMO-OFDM system, and wherein values of power of the sub-channels assigned to the same user are the same.

20. The resource allocation apparatus as claim 17, wherein the scheduling rule is Max-Min rule, the sub-channel is assigned to one of the users who has a maximal weakest eigenmode when each of the first through x-th sub-channels is sequentially assigned to one of the users according to the scheduling rule, and the non-assigned sub-channel is assigned to one of the users who has a maximal weakest eigenmode when each of the non-assigned sub-channels is sequentially assigned to one of the users according to the scheduling rule.

21. The resource allocation apparatus as claim 17, wherein the scheduling rule is Max Sum-Rate rule, the sub-channel is assigned to one of the users who has a maximal capacity when each of the first through x-th sub-channels is sequentially assigned to one of the users according to the scheduling rule, and the non-assigned sub-channel is assigned to one of the users who has a maximal capacity when each of the non-assigned sub-channels is sequentially assigned to one of the users according to the scheduling rule.

22. A resource allocation method for a MU-MIMO-OFDM system, the MU-MIMO-OFDM system has a plurality of users and sub-channels, and the method comprising:
assigning, by a device, a plurality of preset assigned sub-channel numbers to the plurality of users according a plurality of capacity ratio constraints, wherein the capacity ratio constraints are computed according to a number of the users, whether an n-th sub-channel is occupied by a k-th user, and all eigenmodes of the n-th sub-channel when the n-th sub-channel is assigned to the k-th user; next, the sub-channel resource allocation apparatus sequentially assigns each of the first through x-th sub-channels to one of the plurality of users according to a scheduling rule, wherein x is a summation of the preset assigned sub-channel numbers; and next, the sub-channel resource allocation apparatus assigns sequentially and respectively non-assigned sub-channels, which are not the first through x-th sub-channels, to the plurality of users according to a scheduling rule, wherein each of the plurality of users is assigned at most one of the non-assigned sub-channels; and
allocating power to each of the plurality of users according to a limit power of the MU-MIMO-OFDM system, wherein values of power of the sub-channels assigned to the same user are the same.

23. The resource allocation method as claim 22, wherein the scheduling rule is Max-Min rule, the sub-channel selects one of the users who has a maximal weakest eigenmode when each of the sub-channels sequentially selects one of the users according to a scheduling rule.

24. The resource allocation method as claim 22, wherein the scheduling rule is Max Sum-Rate rule, the sub-channel selects one of the users who has a maximal capacity when each of the sub-channels sequentially selects one of the users according to a scheduling rule.

25. A resource allocation apparatus for a MU-MIMO-OFDM system, the MU-MIMO-OFDM system has a plurality of users and sub-channels, and the resource allocation apparatus comprising:
a sub-channel resource allocation apparatus, for assigning a plurality of preset assigned sub-channel numbers to the plurality of users according a plurality of capacity ratio constraints, wherein the capacity ratio constraints are computed according to a number of the users, whether an n-th sub-channel is occupied by a k-th user, and all eigenmodes of the n-th sub-channel when the n-th sub-channel is assigned to the k-th user; next, the sub-channel resource allocation apparatus sequentially assigns each of the first through x-th sub-channels to one of the plurality of users according to a scheduling rule, wherein x is a summation of the preset assigned sub-channel numbers; and next, the sub-channel resource allocation apparatus assigns sequentially and respectively non-assigned sub-channels, which are not the first through x-th sub-channels, to the plurality of users according to a scheduling rule, wherein each of the plurality of users is assigned at most one of the non-assigned sub-channels; and
a power resource allocation apparatus, for allocating power to each of the users according to a limit power of the MU-MIMO-OFDM system, wherein values of power of the sub-channels assigned to the same user are the same.

26. The resource allocation apparatus as claim 25, wherein the scheduling rule is Max-Min rule, each of the sub-channels is sequentially assigned to one of the users who has a maximal weakest eigenmode when each of the sub-channels is sequentially assigned to one of the users according to a scheduling rule.

27. The resource allocation apparatus as claim 25, wherein the scheduling rule is Max Sum-Rate rule, each of the sub-channels is sequentially assigned to one of the users who has a maximal capacity when each of the sub-channels is sequentially assigned to one of the users according to a scheduling rule.

* * * * *

UNITED STATES PATENT AND TRADEMARK OFFICE
CERTIFICATE OF CORRECTION

PATENT NO. : 8,165,076 B2  Page 1 of 1
APPLICATION NO. : 12/208319
DATED : April 24, 2012
INVENTOR(S) : Wang et al.

It is certified that error appears in the above-identified patent and that said Letters Patent is hereby corrected as shown below:

On the title page of the patent grant, item (54) and in the specification, col. 1, line 1, Title of the Invention "RESOURCE ALLOCATION METHOD FOR MULTI-USERS MULTIPLE INPUT MULTIPLE OUTPUT ORTHOGONAL FREQUENCY DIVISION MULTIPLEXING SYSTEM AND APPARAUS THEREOF" should be corrected to --RESOURCE ALLOCATION METHOD FOR MULTI-USERS MULTIPLE INPUT MULTIPLE OUTPUT ORTHOGONAL FREQUENCY DIVISION MULTIPLEXING SYSTEM AND APPARATUS THEREOF--.

On the title page of the patent grant, the item (73) Assignee's Name, should read Industrial Technology Research Institute, Hsinchu (TW)
National Chiao Tung University, Hsinchu (TW)

Signed and Sealed this
Eleventh Day of June, 2013

Teresa Stanek Rea
*Acting Director of the United States Patent and Trademark Office*